US010628088B2

(12) United States Patent
Matsushita et al.

(10) Patent No.: US 10,628,088 B2
(45) Date of Patent: Apr. 21, 2020

(54) COMPUTER SYSTEM

(71) Applicant: HITACHI, LTD., Tokyo (JP)

(72) Inventors: Takaki Matsushita, Tokyo (JP); Tomohiro Kawaguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 27 days.

(21) Appl. No.: 15/755,930

(22) PCT Filed: Dec. 25, 2015

(86) PCT No.: PCT/JP2015/086197
§ 371 (c)(1),
(2) Date: Feb. 27, 2018

(87) PCT Pub. No.: WO2017/109931
PCT Pub. Date: Jun. 29, 2017

(65) Prior Publication Data
US 2018/0349063 A1    Dec. 6, 2018

(51) Int. Cl.
*G06F 3/06* (2006.01)

(52) U.S. Cl.
CPC .......... *G06F 3/0665* (2013.01); *G06F 3/0607* (2013.01); *G06F 3/067* (2013.01); *G06F 3/0608* (2013.01); *G06F 3/0631* (2013.01); *G06F 3/0689* (2013.01)

(58) Field of Classification Search
CPC ............................. G06F 3/0665; G06F 3/0631
See application file for complete search history.

(56) References Cited

U.S. PATENT DOCUMENTS

| | | |
|---|---|---|
| 8,516,215 B2 | 8/2013 | Satoyama et al. |
| 8,862,805 B2 | 10/2014 | Yamamoto et al. |
| 2007/0150690 A1* | 6/2007 | Chen ..................... G06F 3/0608 |
| | | 711/170 |

(Continued)

FOREIGN PATENT DOCUMENTS

| | | |
|---|---|---|
| WO | 2014/184941 A1 | 11/2014 |
| WO | 2015/145532 A1 | 10/2015 |
| WO | 2015/173925 A1 | 11/2015 |

OTHER PUBLICATIONS

International Search Report and Written Opinion dated Mar. 1, 2016 of International Application No. PCT/JP2015/086197.

*Primary Examiner* — Edward J Dudek, Jr.
(74) *Attorney, Agent, or Firm* — Volpe and Koenig, P.C.

(57) ABSTRACT

The storage system defines, a RAID group having one or more logical devices, and manages the logical devices by assigning them to a pool. When a data write request is received from the host for the virtual volume, the storage system allocates an unused logical storage area in the pool to the virtual volume and writes the data to the storage device having the allocated logical storage area. The storage device compresses the data, stores it in the physical area, and manages the physical area in association with the logical storage region. A computer system may increase the amount of the physical area assigned to the pool when a physical usage amount of the physical area belonging to the pool exceeds a predetermined threshold value, and increase the amount of the logical storage area assigned to the pool when the logical usage amount exceeds a predetermined threshold value.

15 Claims, 22 Drawing Sheets

(56) References Cited

U.S. PATENT DOCUMENTS

| | | | |
|---|---|---|---|
| 2010/0082900 A1* | 4/2010 | Murayama | G06F 3/0608 |
| | | | 711/114 |
| 2011/0016287 A1* | 1/2011 | Acedo | G06F 3/0608 |
| | | | 711/171 |
| 2015/0378613 A1 | 12/2015 | Koseki | |

* cited by examiner

| Pool Number | Virtual Volume Number | Virtual Page# | Host LBA | Pool Volume Number | Page# |
|---|---|---|---|---|---|
| 1 | 1 | 0 | 0x0000 | 204 | 0 |
| 1 | 1 | 1 | 0x0010 | 201 | 0 |
| ... | ... | ... | ... | ... | ... |
| 1 | 2 | 0 | 0x0000 | 203 | 2 |
| 1 | 2 | 1 | 0x0010 | 202 | 2 |
| 1 | 2 | 2 | 0x0020 | 201 | 1 |
| ... | ... | ... | ... | ... | ... |

701-1  701-2  701-3  701-4  701-5  701-6

Dynamic Mapping Table 701

Logical/Physical Address Conversion Table (LP Conversion Table) 702

FIG. 9

| RG Number | Pool VOL Capacity Sum (Logical Capacity) | Real Capacity within the Pool | Real Usage Amount | Relocation Request Bit |
|---|---|---|---|---|
| 10 | 200TB | 100TB | 80TB | 1 |
| 11 | 400TB | 200TB | 150TB | 0 |
| 12 | 600TB | 300TB | 100TB | 0 |
|  |  |  |  |  |

Compressed RG Capacity Information Management Table 703

Pool

| Pool Capacity | Logical Capacity (Usage Amount/Total) | 660TB/1000TB |
|---|---|---|
| | Real Capacity (Usage Amount/Total) | 400TB/600TB |
| Virtual VOL Capacity | Total | 400TB |
| Number of Pools | | 3 |

601
602
603
604

Pool Summary

605  606  607  608  609  610

| Pool ID | State | Logical Capacity | | Real Capacity | |
|---|---|---|---|---|---|
| | | Logical Capacity | Logical Usage Amount | Real Capacity | Real Usage Amount |
| 1 | Exceeds Real Usage Amount Threshold Value | 400 | 200 (50%) | 200 | 180 (90%) |
| 2 | Exceeds Logical Usage Amount Threshold Value | 400 | 360 (90%) | 200 | 120 (60%) |
| 3 | Less than Threshold Value | 200 | 100 (50%) | 200 | 100 (50%) |

FIG. 21

Pool Reduction
  Pool Name: Pool 2

Reduction Result Prediction

| Threshold Value | | Capacity(Usage Amount/Total) | | |
|---|---|---|---|---|
| Warning Threshold Value | Exhaustion Threshold Value | | Before Reduction | After Reduction |
| 70% | 80% | Logical Capacity | 800TB | 550TB |
| | | Real Capacity | 400 | 300 |

Automatically Selected Pool VOL

| VOL ID | Capacity | RG ID | RAID LEVEL | Drive Type |
|---|---|---|---|---|
| 1 | 50TB | 1 | RAID-5 | SSD |
| 2 | 150TB | 2 | RAID-5 | SSD (Compressed) |
| 3 | 50TB | 3 | RAID-1 | SAS HDD |

Apply    Cancel

FIG. 22

Pool Expansion

Pool Name: Pool 1
Automatically Selected LDEV

| VOL ID | Capacity | RG ID | RAID LEVEL | Drive Type |
|---|---|---|---|---|
| 1 | 10TB | 4 | RAID-5 | SSD |
| 2 | 20TB | 5 | RAID-1 | SSD (Compressed) |
| 3 | 30TB | 6 | RAID-6 | SAS-HDD |

B902-14

Apply    Cancel

COMPUTER SYSTEM

TECHNICAL FIELD

The present invention relates to computer systems.

BACKGROUND ART

Storage systems may include a plurality of storage devices for storing data as well as storage controllers for controlling the storage devices, and aim to provide large-capacity data storage spaces in the host computer.

Storage systems are required to store large amounts of data at low cost. As a technique for satisfying this requirement, for example, a technique called Thin Provisioning disclosed in Patent Document 1 is known. Storage systems utilizing the thin provisioning technology may provide a virtual volume to the host computer. In an initial state, no storage area is allocated to the storage space of the virtual volume. Upon receiving the write request from the host computer, the storage system allocates a storage area to the area that received the write request. The total size of the virtual volumes may be larger than the total amount of the storage areas mounted in the storage system. In thin provisioning technology, it is not always necessary to prepare a storage area corresponding to the size of the virtual volume from the beginning, such that that storage area can be saved.

In storage systems that utilize thin provisioning technology, the storage area to be allocated to the virtual volume is stored in a pool and managed. However, if all the storage areas belonging to the pool are allocated to a virtual volume, the storage system cannot receive write requests for the unallocated area from the host. According to the technology disclosed in Patent Document 1, the storage system monitors the free capacity of the pool so as to prevent such a situation from occurring. When the usage amount of the whole pool (the amount of storage area allocated to the virtual volume) exceeds the threshold value, the storage system adds a new storage area to the pool.

Another technique for cost reduction is compression technology. For example, Patent Document 2 discloses a storage system equipped with a storage device (flash package) having a compression function. In this storage system, write data from a host computer is compressed and stored in the flash package. Since the size of the data stored in the flash package is reduced by compression, the storage capacity (apparent storage capacity) that the flash package provides to the storage system may be larger than the total size of the storage medium (flash memory ships) included in the flash package.

CITATION LIST

Patent Literature

[Patent Document 1] U.S. Pat. No. 8,516,215
[Patent Document 2] U.S. Pat. No. 8,862,805

SUMMARY OF INVENTION

Technical Problem

When a storage device having a compression function is used as a storage area to be allocated to a virtual volume, the storage area can be used more efficiently than when the thin provisioning technique and the compression technique are used individually. However, when compressing data, the compression rate fluctuates depending on the data content. In the case where the compression rate is poor, there may be situations in which the storage device has insufficient storage medium area and cannot store data even though an unused storage area exists in the pool. Such a situation cannot be avoided merely by monitoring the pool usage amount as in the technique disclosed in Patent Document 1.

Solution to Problem

A computer system according to one aspect of the present invention includes a storage system having a plurality of storage devices that have a physical area and processors, and provides a virtual volume to a host as well as a management server that manages the storage system. The storage system defines, using logical storage regions provided by a plurality of storage devices, a RAID group having one or more logical devices, and manages the logical devices by assigning them to a pool. Upon receiving a data write request from the host to the virtual volume, the storage system allocates an unused logical storage area in the pool to the virtual volume, and writes data to the storage device having the allocated logical storage area. The storage device which has accepted the data write request is configured to generate compressed data, store the compressed data in the physical area, and manage the physical area in which the compressed data is stored in association with the logical storage area.

Further, in the computer system according to one aspect of the present invention, when the physical usage amount of the physical area belonging to the pool exceeds a predetermined threshold value, the amount of the physical area belonging to the pool is increased, and when the logical usage amount of the logical storage area exceeds a predetermined threshold value, the amount of the logical storage area belonging to the pool is increased.

Advantageous Effects of Invention

According to the storage system according to one aspect of the present invention, even when a storage device having a compression function is used, the capacity of the pool can be appropriately managed.

BRIEF DESCRIPTION OF DRAWINGS

FIG. 9 is a configuration example of a compressed RG capacity information management table.
FIG. 10 is an example of the pool capacity management screen.

FIG. 21 is an example of a management screen at the time of execution of the pool VOL configuration optimizing program.

FIG. 22 is an example of a management screen at the time of execution of the pool VOL configuration optimization program.

DESCRIPTION OF EMBODIMENT(S)

Figure 1:
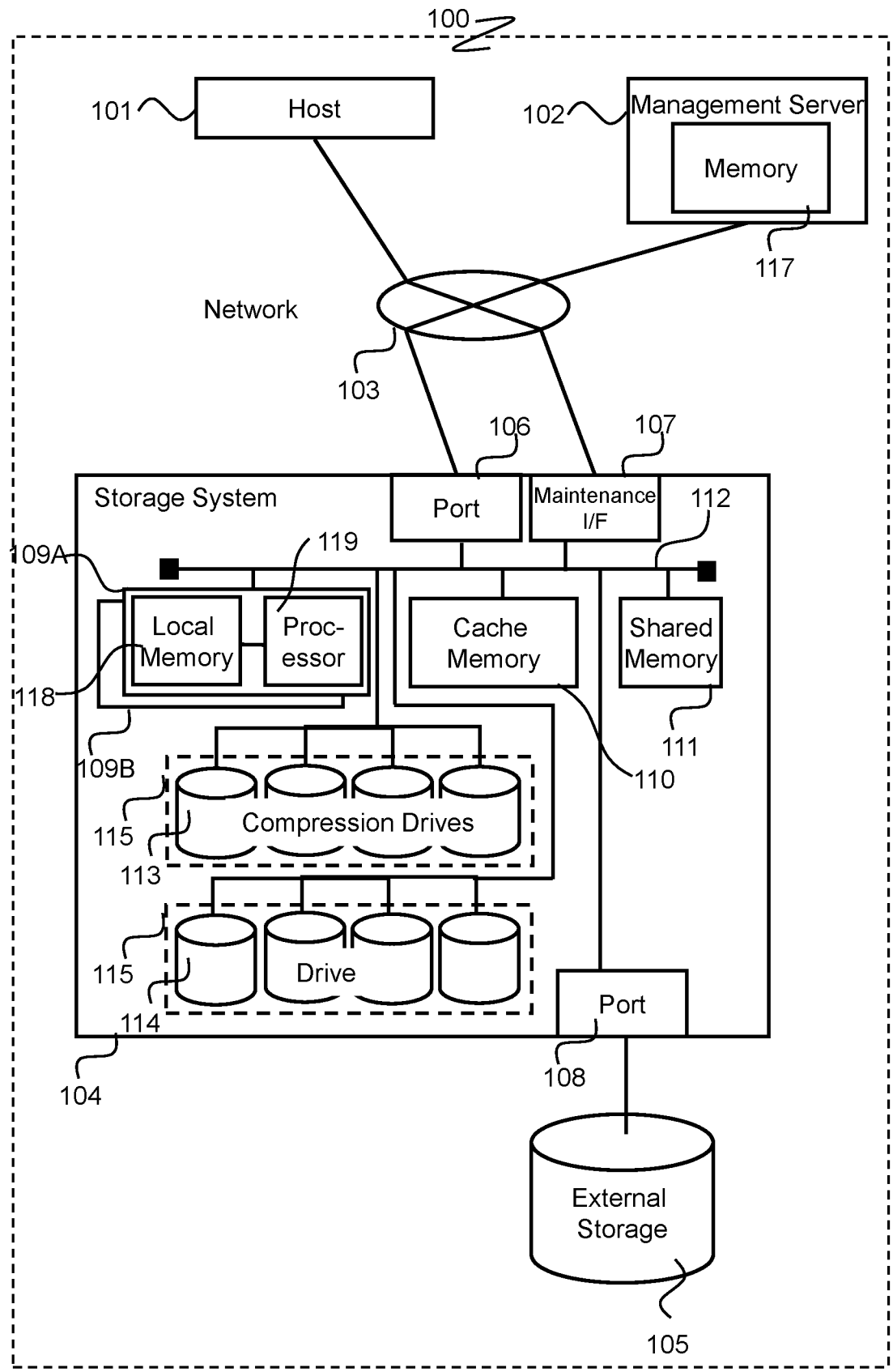
FIG. 1 is a configuration example of a computer system according to an embodiment of the present invention.

Hereinafter, embodiments of the present invention will be described with reference to the Figures. It is to be noted that the embodiments described below do not limit the invention according to the claims, and all the elements and combinations thereof described in the embodiments are not necessarily indispensable for solving means of the invention.

Also, in the present specification, there are cases in which expressions are used which refer to a program performing some processing (an expression in which the program is the subject of the operation). As the program is executed by the processor, the processing described in the program is executed by the computer (the storage system or the management server described below), such that the expression with the program as the subject of operation is not necessarily the accurate expression. However, in order to avoid redundant explanation, in the present specification, the contents of processing may be explained with a "program" as the subject. In addition, various programs may be provided to a user using a program by a program distribution server or a storage medium readable by a computer, and installed in a computer that executes the program. The storage medium readable by the computer may be a non-transitory computer readable medium, such as a nonvolatile storage medium such as an IC card, an SD card, a DVD, or the like. Also, part or all of the program may be realized by dedicated hardware.

Before describing the embodiments, various terms used in the embodiments will be described.

In the following embodiments, "compression" refers to a process of reducing the data size while maintaining the meaning of data using a lossless compression algorithm such as an LZW algorithm. In the computer system according to the embodiments, the storage device mounted in the storage system may compress the data written from the host. Data whose size is reduced due to compression processing in the storage system is referred to as "compressed data", and data which is not subjected to compression processing in the storage system is referred to as "uncompressed data" or "decompressed data". The process of returning the compressed data to the original data size by using the lossless compression algorithm is called "expansion".

In the following embodiments, "compression rate" is used as an index of data size reduction efficiency by data compression. The compression rate in this specification is defined by the following formula.

$$\text{Compression rate} = \text{size of compressed data} \div \text{size of uncompressed data}$$

"Updating" of the storage area refers to rewriting (overwriting) the contents of the data stored in the storage area with new contents. Before a certain storage area is updated, the data stored in the storage area is called "pre-update data". On the other hand, data newly written in the storage area is called "update data" or "updated data".

"Volume" refers to a storage space provided by a target device such as the storage system or the storage device to an initiator such as the host computer or the like. Also, in this specification, "block" is used as a term referring to a region on a volume. A block is a fixed size area (512 bytes as an example) equal to the minimum access unit when the initiator accesses the volume.

When the initiator accesses each block on the volume, it accesses by designating an address assigned to each block. This address is called a "Logical Block Address (LBA)". In the following embodiments, a block to which the nth LBA (n is a nonnegative integer value) is assigned is referred to as "LBA # n". In the following embodiments, in particular, an LBA assigned to a block of a volume (virtual volume) that the storage system provides to the host may be referred to as a "host LBA".

EMBODIMENTS (1) System Configuration

Hereinafter, embodiments will be described with reference to the Figures. FIG. 1 illustrates a configuration example of a computer system 100 according to an embodiment. The computer system 100 includes a host computer 101 (hereinafter abbreviated as "host 101"), a management server 102, and a storage system 104. The host 101, the management server 102, and the storage system 104 are mutually connected via a network 103. As an example, the network 103 is a SAN (Storage Area Network) formed using a fiber channel.

The host 101 may be a computer that uses the virtual volume provided by the storage system 104. The host 101 may access the data stored in the virtual volume by issuing a read command and a write command to the virtual volume.

The management server 102 may be a computer for managing the storage system 104, and may include a processor and a memory like a general-purpose computer such as a personal computer. In the present embodiment, management specifically indicates a process of referring to the state of the storage system 104 or modifying the configuration of the storage system 104. In the management server 102, a management program for managing the storage system 104 is executed. The management server 102 also has input/output devices such as a keyboard and a display, and can output (display) information such as the state of the storage system 104 on a display or the like.

The storage system 104 is a device that may provide one or more volumes (virtual volumes) to the host 101. The storage system 104 includes a port 106, a maintenance interface 107 (denoted as "maintenance I/F" in the Figures), a port 108, microprocessor package boards 109 (109 A, 109 B), a cache memory 110, a shared memory 111, a compression drive 113, and a drive 114. In addition, these elements are interconnected by a bus 112. Among these components, a collection of the port 106, the maintenance I/F 107, the port 108, the microprocessor package boards 109, the cache memory 110, the shared memory 111, and the bus 112 may be referred to as a storage controller.

The compression drive 113 and the drive 114 are storage devices having a nonvolatile storage medium for storing write data from the host 101. As the storage medium, for example, a nonvolatile semiconductor memory such as a magnetic disk or a flash memory can be used. The compression drive 113 and the drive 114 may, for example, be HDDs (Hard Disk Drives) or SSDs (Solid State Drives). However, in this embodiment, an example of a compression drive 113 using a flash memory as a storage medium will be described.

The difference between the compression drive 113 and the drive 114 is that the compression drive 113 has a function (compression function) of compressing write data and storing it in its own storage medium, but the drive 114 does not have a compression function. It should be noted that, in the following description, the compression drive 113 and the drive 114 are referred to as "storage devices" when they are expressed without distinction.

The port 106 is an interface device used for the storage system 104 to communicate with an initiator such as the host 101. Commands (a read command, a write command, etc.) issued by the host 101 to access the virtual volume arrive at the port 106. When the storage system 104 returns information such as a response to the host 101, the information is returned from the port 106.

The maintenance I/F 107 is an interface device for the storage system 104 to communicate with the management server 102. The command from the management server 102 arrives at the maintenance I/F 107. When the storage system 104 returns information such as a response to the management server 102, information is returned from the maintenance I/F 107.

First Embodiment

In FIG. 1, the configuration in which both the port 106 and the maintenance I/F 107 are connected to the network 103 is illustrated, but other configurations are also possible. The network to which the port 106 is connected and the network to which the maintenance I/F 107 is connected may be different networks.

The port 108 is an interface device for allowing the storage system 104 to communicate with a target device such as an external storage 105. The external storage 105 may be storage device such as the drive 114 or a large capacity storage device having a plurality of storage devices such as the storage system 104. When the external storage 105 is connected to the port 108, the storage system 104 can use the storage area provided by the external storage 105 as a storage area provided by the drive 114.

The microprocessor package board (hereinafter referred to as "MPB") 109 is a package board having a processor 119 and a local memory 118. The processor 119 is a device that executes a program for performing various controls of the storage system 104. The local memory 118 is used to temporarily store programs executed by the processor 119 and information used by the processor 119. In FIG. 1, the storage system 104 includes two MPBs 109 (MPBs 109 A and 109 B), but the number of MPBs 109 may be more or less than 2. Configurations in which only one MPB 109 is mounted in the storage system 104 are also possible, as well as configurations in which three or more MPBs 109 may be mounted.

The cache memory 110 may be used for temporarily storing write data for a virtual volume (storage device) or data (read data) read from a virtual volume (storage device). As the cache memory 110, a volatile storage medium such as DRAM, SRAM or the like is used, but in another embodiment, a nonvolatile memory may be used for the cache memory 110. In addition, when a volatile storage medium is used as the cache memory 110, it is also possible for an auxiliary power supply such as a battery to be mounted in the storage system 104 so that stored contents of the cache memory 110 can be maintained using an auxiliary power supply in the event of a power failure.

The shared memory 111 is a storage area for storing the management information used by (the processor 119 of) the MPB 109. Like the cache memory 110, the volatile storage medium such as DRAM, SRAM or the like is used for the shared memory 111, but the nonvolatile memory may be used. Unlike the local memory 118, the cache memory 110 and the shared memory 111 are storage areas accessible from the processor 119 of any MPB 109 (for example, MPB 109 A and MPB 109 B).

Figure 2:
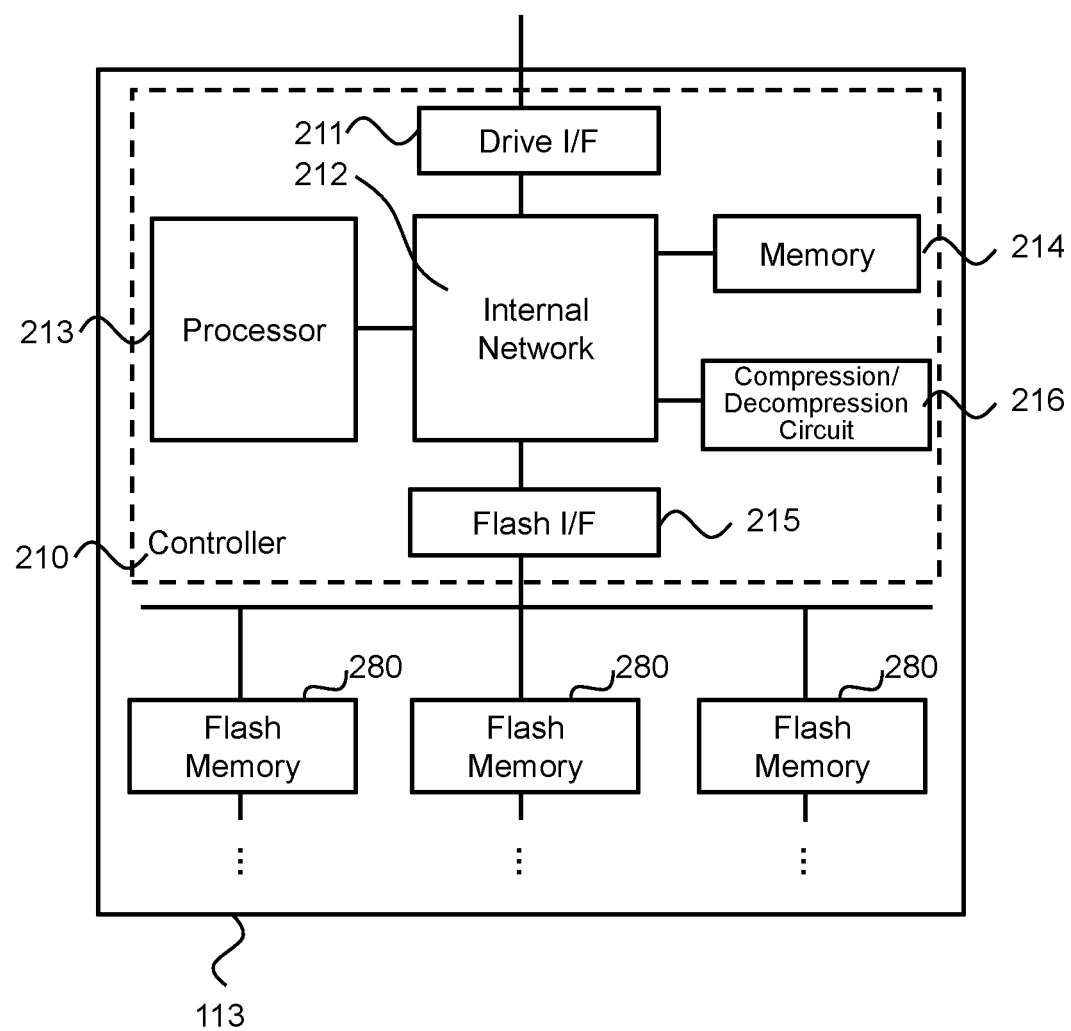
FIG. 2 is a configuration example of a compression drive.

Next, the configuration of the compression drive 113 will be described with reference to FIG. 2. The compression drive 113 has a controller 210 and a flash memory 280 which is a storage medium for storing write data from the host 101. The controller 210 has a drive I/F 211, a processor 213, a memory 214, a flash I/F 215, and a compression/decompression circuit 216, which are interconnected via an internal network 212.

The drive I/F 211 is an interface device for communicating with the storage system 104. Similarly, the flash I/F 215 is an interface device for the controller 210 to communicate with the flash memory 280.

The processor 213 may execute a program for controlling the compression drive 113. The memory 214 may be used for storing programs executed by the processor 213, control information used by the processor 213, and the like. In the present embodiment, the processing (storage area management, processing of access request from the storage system 104, etc.) performed by the compression drive 113 described below is performed by the processor 213 executing the program.

The compression/decompression circuit 216 is a device that compresses or decompresses data. The compression/decompression circuit 216 is implemented by hardware such as ASIC (Application Specific Integrated Circuit). However, the compression/decompression circuit 216 may be composed of a CPU and a memory. In that case, the data is compressed (or decompressed) by executing a program for data compression (or decompression) in the CPU. Alternatively, the processor 213 may compress or decompress the data by executing a program for data compression (or decompression) in the processor 213). In this case, the controller 210 does not need the compression/decompression circuit 216.

(2) Storage Area Management

Next, a storage area handled by the storage system 104 according to the present embodiment will be described. First, the volume that the storage device (particularly, the compression drive 113) provides to the storage system 104 will be described with reference to FIG. 3.

The compression drive 113 provides one volume (storage space) to an initiator. In the case of the present embodiment, as the compression drive 113 is connected to the storage system 104, the initiator for the compression drive 113 is (the processor 119 of) the storage system 104. The size of the volume provided by the compression drive 113 may be larger than the total storage capacity of the storage medium (flash memory 280) possessed by the compression drive 113.

Figure 3:
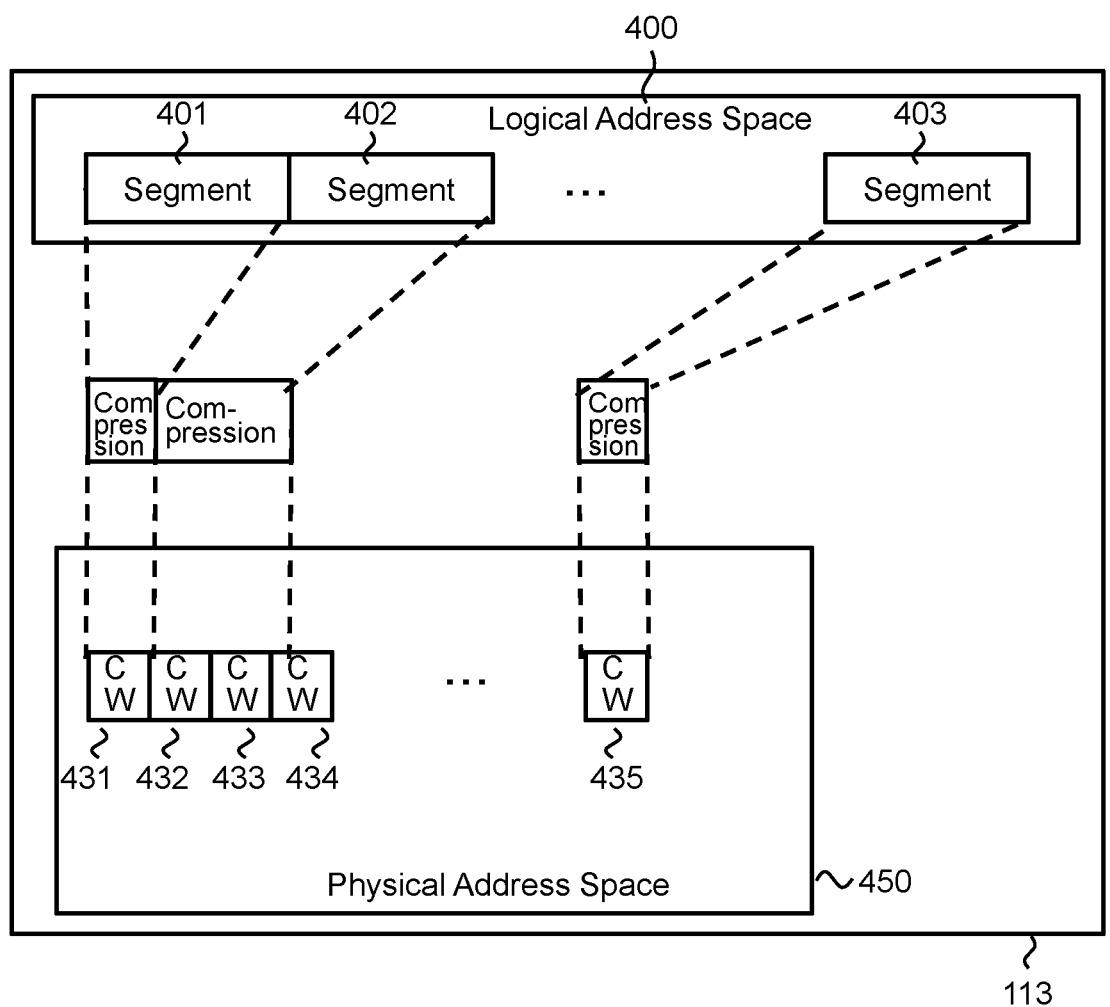
FIG. 3 is an explanatory diagram of a storage area handled by a storage system.

In the present embodiment, the volume that the compression drive 113 provides to the initiator is referred to as a "logical address space (of the compression drive 113)" (logical address space 400 in FIG. 3). Also, the size of the logical address space 400 is referred to as a "logical capacity (of the compression drive 113)". In contrast, the compression drive 113 also manages the storage space constituted by the storage areas of all the flash memories 280 possessed by the compression drive 113. This storage space is called a physical address space (physical address space 450 in FIG. 3). The area on the physical address space is called a "physical area". The size of the physical address space is equal to the total storage capacity of the flash memory 280 of the compression drive 113. Also, the size of the physical address space is referred to as a "real capacity (of the compression drive 113)". In other words, the real capacity can be said to be the total size of the physical area in which data can be stored.

As described above, the compression drive 113 compresses the write data from the initiator using the compression/decompression circuit 216, and stores the compressed write data (compressed data) in the physical area. In the present embodiment, as an example, the compression drive 113 may divide the logical address space 400 into partial areas of 4 KB each, and compress each partial area. In the present embodiment, the 4 KB partial areas on the logical address space 400 are called "segments". For example, when the storage system 104 writes data to an area of 8 KB from the top of the logical address space 400 of the compression drive 113, the compression drive 113 first compresses the data written to the segment 401 of the logical address space 400 (the area from the LBA #0 to LBA #7). Subsequently, the compression drive 113 compresses the data written to the segment 402 (the area from the LBA #8 to the LBA #15) located second from the top of the logical address space 400.

The compressed data is stored in the physical area. In the present embodiment, the controller 210 divides the physical area (physical address space 450) into partial areas of 512 B each, and allocates these partial areas to compressed data. Here, "allocating" refers to the controller 210 managing, using a mapping table or the like, the correspondence relationship (mapping) between the addresses of the segment on the logical address space 400 that received write requests from the storage system 104 and the addresses of the partial area (and the size of this physical area) where the compressed data of the write data written to these segments is stored. In the present embodiment, the partial area on the physical address space 450 is called a "code word". In FIG. 3, it is represented by CW 431 to 435. For example, the compressed data for segment 401 may be allocated to CW 431. Three pieces of compressed data for the segment 402 are allocated: CW 432, CW 433, and CW 434. The size of the physical area managed by the mapping table is equal to the sum of the sizes of the code words allocated to the compressed data of the write data written to the segment.

When the controller 210 receives a read request designating an address on the logical address space 400 from the storage system 104, by referring to this mapping table, it is possible to identify the address of the physical area mapped to the area (segment) designated by the read request. Then, the controller 210 reads the compressed data from the physical area corresponding to the specified address, and decompresses the read compressed data by using the compression/decompression circuit 216. Further, the controller 210 returns the decompressed data to the storage system 104.

Note that the mapping between the address of the segment (the address on the logical address space 400) and the address of the physical area (the address on the physical address space 450) is not necessarily static, but may be dynamic mapping. Upon receiving the update request and the update data for the segment, the controller 210 stores the compressed data of the update data in a physical area different from the physical area in which the pre-update data is written. Therefore, every time an update to a segment occurs, the contents of the mapping table are changed. The physical area in which the pre-update data is written is changed into a state in which new data can be written by performing a subsequent erasure process. This is similar to the processing performed in the conventional flash memory storage.

The size of the compressed data can vary depending on the data content. The present embodiment will be explained on the premise that when the compression/decompression circuit 216 compresses 4 KB of data (one segment), the data size after compression becomes 512 bytes at the minimum (in cases where the data size becomes ⅛ as compared with before compression) and 4 KB at the maximum (in cases where the data size does not change with respect to prior to compression). The smaller the data size after compression, the better the compression rate.

In cases where the compression rate is the best, that is, when the size of all the data is reduced to ⅛ compared to before compression, the compression drive 113 can store data of eight times the real capacity. In the present embodiment, the logical capacity of the compression drive 113 is determined according to the case where the compression ratio is the best. That is, the logical capacity of the compression drive 113 is eight times the real capacity.

Like the compression drive 113, the drive 114 also provides one volume to the storage system 104. However, as the drive 114 does not compress the data, the size of the volume is the same as the capacity of the storage medium of the drive 114. That is, the logical capacity and the real capacity of the drive 114 are equal.

Figure 4:
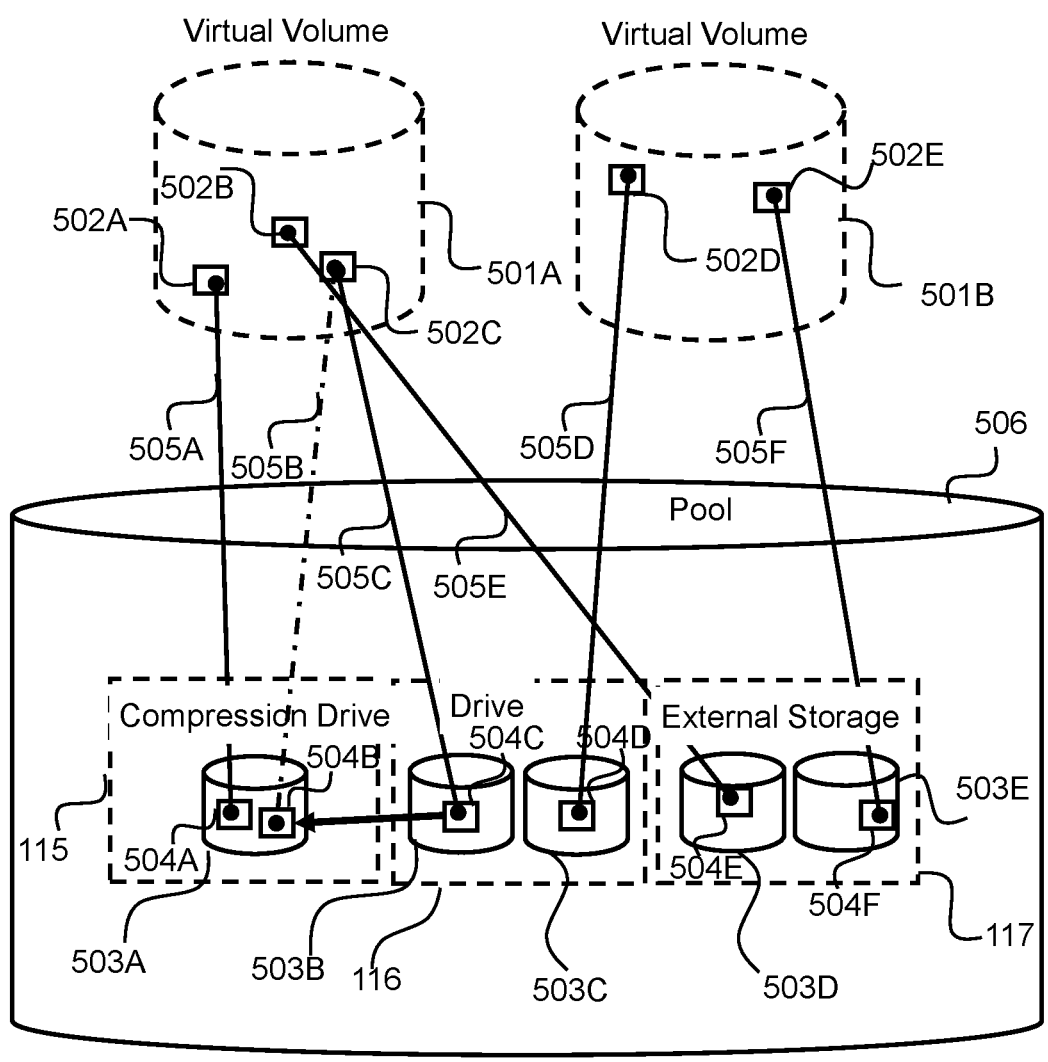
FIG. 4 is a conceptual diagram illustrating a relationship between a compression drive, a drive, an external storage, and a virtual volume.

Next, the virtual volume provided by the storage system 104 to the host 101 will be described. FIG. 4 is a conceptual diagram illustrating the relationship between the compression drive 113, the drive 114, the external storage 105, and the virtual volume.

The storage system 104 provides the host 101 with volumes (hereinafter referred to as "virtual volumes") formed by the thin provisioning technology. As is well known, when virtual volumes are in an initial state, (immediately after the definition of the virtual volume), storage areas are not associated with each block on the virtual volume. When the host 101 issues a data write request (write command) to the block on the virtual volume, the storage system 104 allocates a storage area to that block.

An area on the volume provided by the compression drive 113, the drive 114, or the external storage 105 to the storage system 104 is dynamically allocated to the block on the virtual volume. Hereinafter, the area on the volume that the compression drive 113, the drive 114, or the external storage 105 provides to the storage system 104 is referred to as a "logical storage area".

The storage system 104 defines a management unit called a "pool" in order to manage an area that can be allocated to the virtual volume in the logical storage area. When allocating a logical storage area to the area on the virtual volume, the storage system 104 allocates an unused logical storage area (a logical storage area not yet allocated to any virtual volume yet) from the logical storage areas belonging to the pool). The process of assigning the logical storage area to the pool is performed by the user using the management server 102.

In addition, the storage system 104 may form one storage space from the volumes of the plurality of storage devices using RAID technology. In the present embodiment, a storage space formed by using the RAID technology or a collection of storage devices constituting this storage space is referred to as a "RAID group". As is well known, redundant data (parity) generated using write data is also stored in the RAID group in addition to write data from the host 101.

In the storage system 104 according to this embodiment, the storage devices belonging to one RAID group are all limited to the same type. For example, the compression drive 113 and the drive 114 should not be mixed in a RAID group. In the following description, a RAID group including only the compression drive 113 is referred to as a "compressed RG".

Figure 5:
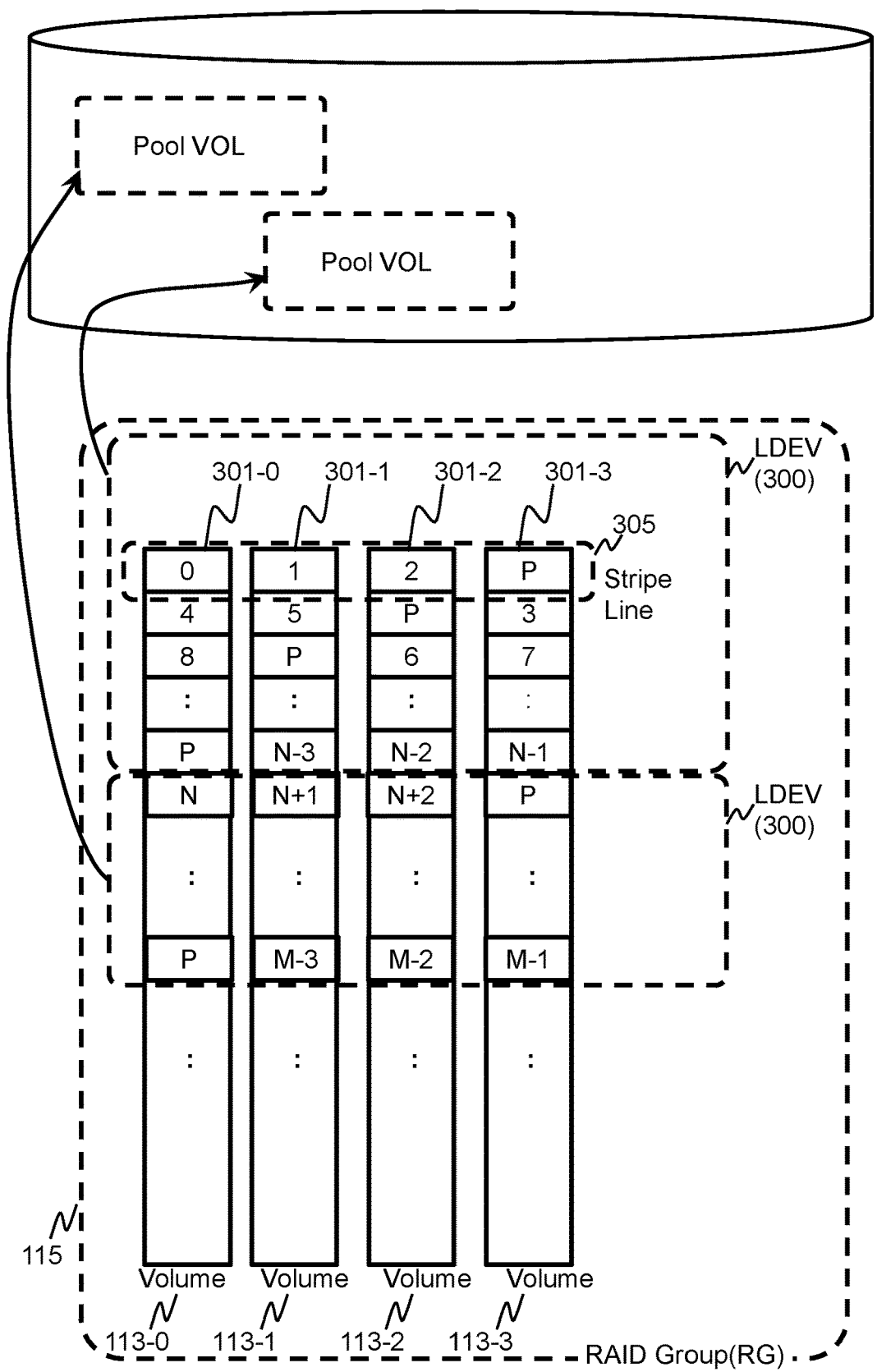
FIG. 5 is a diagram illustrating a configuration example of a RAID group.

FIG. 5 illustrates an example of a RAID group. In FIG. 5, the volumes (113-0) to (113-3) represent the volumes that the storage device (for example, the compression drive 113) provides to the storage system 104. In FIG. 5, an example in which a RAID group 115 is formed by four volumes ((113-0) to (113-3)) is illustrated.

The storage system 104 divides each volume ((113-0) to (113-3)) into areas of a predetermined size (for example, 64 KB) called stripe blocks (301-0 to 301-3 in FIG. 5), and manages them. In FIG. 5, the stripe block described as "P" among the stripe blocks is a stripe block storing redundant data (parity), and is called a "parity stripe". On the other hand, the stripe blocks described with numerals (0, 1, etc.) are stripe blocks in which data written from the host 101 (data which is not redundant data) is stored. These stripe blocks are called "data stripes".

In the parity stripes, redundant data generated by the storage system 104 is stored using a plurality of data stripes. Hereinafter, a set (for example, elements 305 in FIG. 5) of a parity stripe and the data stripes used for generating redundant data to be stored in the parity stripe is referred to as a "stripe line".

Further, when the storage area of the RAID group belongs to the pool, the storage system 104 divides the RAID group into one or more partial areas and makes the partial area belong to the pool. This partial area is referred to as "logical device" or "LDEV" in this embodiment. In FIG. 5, element 300 is the LDEV. The size of the LDEV is arbitrary. However, in this embodiment, as illustrated in FIG. 5, it is assumed that the LDEV 300 may be composed of a plurality of stripe lines. Accordingly, the size of the LDEV 300 is an integral multiple of the size of the stripe line.

The process of defining the LDEV is performed by the user instructing the storage system 104 using the management server 102. An arbitrary number of LDEVs can be defined in the RAID group. The LDEV may be defined at any time, and at the time of the initial state (at the time of introduction of the storage system 104, for example), the user may define only one LDEV in the RAID group, and the user can also define new LDEVs in unused areas (areas not defined as LDEVs) in the RAID group when it becomes necessary to add storage space to the pool.

A plurality of LDEVs can belong to a pool. In the following, a LDEV that belongs to the pool is called a "Pool VOL". Each LDEV belonging to one pool may be an LDEV included in a different RAID group. For example, the LDEV included in the RAID group configured by the compression drive 113 and the LDEV included in the RAID group configured by the drive 114 may belong to one pool.

In addition, the storage system 104 can define a plurality of pools. However, when an LDEV belongs to the pool, a plurality of LDEVs defined in one RAID group composed of compression drives 113 must belong to the same pool. The reason for this restriction is that, when data is stored in the LDEV defined in the RAID group configured by the compression drive 113, the maximum amount of data that can be stored in each LDEV cannot be clearly defined.

For example, when the controller 210 provides the storage system 104 with a logical address space 400 twice as large as the physical address space 450 of the compression drive 113, the logical capacity of the RAID group 115 configured using these compression drives 113 (the total of the logical capacity of the compression drives 113 belonging to the RAID group 115) is twice the real capacity (the total of the real capacity of the compression drives 113 belonging to the RAID group 115). Assuming that the real capacity of the RAID group 115 is V (TB), the logical capacity of the RAID group 115 is 2V (TB).

Consider that two LDEVs (assumed to be LDEV 1 and LDEV 2) are defined by dividing this RAID group so that LDEV 1 belongs to pool 1 and LDEV 2 belongs to pool 2. When data of an amount V (TB) is written to the LDEV 1 and the data has not been reduced in size at all by compression, all of the real capacity of the RAID group (that is, the physical area of V (TB)) is used.

In this state, even if the controller 210 tries to store the data in the LDEV 2 belonging to the pool 2, despite no data having been written to the LDEV 2 at all, the data cannot be written as there is no available physical area in the RAID group. As a result, management of the pool capacity of the user becomes difficult. In order to prevent this problem, a plurality of LDEVs defined in one RAID group composed of compression drives 113 are always assigned to the same pool.

According to this limitation, when an LDEV included in a certain RAID group (provisionally referred to as "RAID group A") belongs to a certain pool (provisionally referred to as "pool #1"), the RAID group A may be referred to as "the RAID group belonging to pool #1" in some cases. In this case, this indicates that each LDEV in the RAID group A belongs to the pool #1 or does not belong to any pool.

In contrast, a plurality of LDEVs defined in one RAID group composed of the drive 114 may belong to a plurality of pools. This is because the data compression is not performed in the drive 114, so that the amount of data storable in the LDEV constituted by the drive 114 does not fluctuate.

When allocating logical storage areas belonging to the pool to virtual volumes, the storage system 104 allocates each area in predetermined sizes called pages. In the present embodiment, the page is a partial area in the LDEV and is made up of one or a more stripe lines.

In addition, the storage system 104 divides and manages the virtual volume in areas called virtual pages. Upon receiving a write request for the virtual page from the host 101, the storage system 104 allocates the unused pages in the pool to the virtual page. In this specification, "unused page" refers to a page that is not assigned to any virtual page. Conversely, a page mapped to a virtual page is referred to as an "in-use page". The relationship (mapping) between the virtual pages and the pages allocated to a virtual page is stored and managed in a dynamic mapping table described later. Reference numerals 502A to 502E in FIG. 4 represent virtual pages to which pages in the pool are allocated, and reference numerals 504A to 504F represent "in-use pages".

When there are multiple pools, each virtual volume belongs to one pool. When the storage system 104 allocates a page to a virtual page of the virtual volume, the unused page in the pool to which the virtual volume belongs are allocated. Incidentally, the page may include parity generated by the RAID technique, but parity cannot be allocated when assigning the page to a virtual page. Therefore, the size of the virtual page is obtained by subtracting the size of the parity stripe included in the page from the size of the page.

Concepts of virtual volumes, RAID groups, pools, logical devices, etc. have been described so far, but processing for defining and managing virtual volumes, RAID groups, pools and logical devices and providing virtual volumes to the host 101 (the process of enabling the host 101 to recognize the virtual volume and bringing the host 101 into an accessible state to the virtual volume) is performed by a program executed by the processor 119. However, as another embodiment, instead of a program, dedicated hardware for executing these processes may be provided in the storage system 104.

(3) Management Information of the Storage System

Next, contents of main management information used in the storage system 104 according to the present embodiment will be described. Before doing so, however, the definitions of terms necessary to understand the contents of the management information will be described.

In the above description, the logical capacity and the real capacity of the storage device (in particular, the compression drive 113) have been described, but in the present embodiment, concepts such as a real usage amount and a logical usage amount are used in addition to the logical capacity and the real capacity. In addition to storage devices, the logical capacity, the real capacity, the real usage amount, and the logical usage amount are also defined for pools and RAID groups.

The logical usage amount and the real usage amount of the compression drive 113 will be described. The total size of the areas written from the initiator in the logical address space of the compression drive 113 is referred to as the logical usage amount of the compression drive 113. Also, the total size of code words mapped to segments on the logical address space written from the initiator is referred to as the real usage amount of the compression drive 113. The definition of the logical usage amount of the drive 114 is the same as the logical usage amount of the compression drive 113. The real usage amount of the drive 114 is equal to the logical usage amount of the drive 114.

When there is a request from the initiator, the compression drive 113 has a function of notifying the initiator of the real capacity and the real usage amount of the compression drive 113. In response to a request from the initiator, the compatible drive 113 also has a function of providing notification of the size of the physical area mapped to each segment on the logical address space 400. The size of the physical area mapped to each segment is the size of the compressed data. With this function, the initiator (storage system 104) can know the size of the compressed data written to each segment.

The logical capacity and real capacity of the RAID group are defined as follows. The RAID group is composed of a plurality of storage devices. The sum of the logical capacities of the storage devices constituting the RAID group is defined as the logical capacity of the RAID group. In contrast, the total of the real capacities of the storage devices constituting the RAID group (that is, the total size of the physical areas of the storage device) is defined as the real capacity of the RAID group. In this embodiment, the logical capacity and the real capacity of the RAID group also include the size of the parity stripe. However, as another embodiment, the size of the parity stripes may not be included in the logical capacity and the real capacity of the RAID group.

Further, the logical usage amount and the real usage amount of the RAID group, particularly the logical usage amount and the real usage amount of the RAID group composed of the compression drive 113 are defined as follows. Among the pages on the RAID group, the total size of the pages (in-use pages) mapped to the virtual pages is defined as the logical usage amount of the RAID group. Also, the total size of the physical areas of the compression drive 113 mapped to the in-use page on the RAID group is referred to as the real usage amount of the RAID group.

The definition of the logical usage amount of the RAID group composed of the drive 114 is the same as the definition of the logical usage amount of the RAID group composed of the compression drives 113. The real usage amount of the RAID group composed of the drives 114 is equal to the logical usage amount.

In this embodiment, it is assumed that the size of the parity stripes is also included in the logical usage amount of the RAID group. However, in another embodiment, a size that does not include the size of the parity stripe may be defined as the logical use amount. Similarly, the real usage amount of the RAID group may include the size of the physical area in which the compressed data of the parity stripe is stored. However, in another embodiment, a definition may be adopted in which the size of the physical area storing the compressed data of the parity stripe is not included in the real usage amount.

The definitions of the logical capacity and logical usage of the LDEV are the same as the definitions of the logical capacity and logical usage of the RAID group. In particular, the total capacity of the pages included in the LDEV is the logical capacity of the LDEV, and among the pages included in the LDEV, the total size of the in-use pages is the logical usage amount of the LDEV.

The logical capacity, real capacity, logical usage amount and real usage amount of the pool are defined as follows. The total logical capacity of the LDEV (pool VOL) belonging to the pool is the logical capacity of the pool. In other words, the total capacity of the pages included in the pool VOL is the logical capacity of the pool.

Similar to the other real capacity definitions, the real capacity of the pool is the total size of the physical areas (usable in the pool) belonging to the pool, but it is defined as a value calculated by the following procedure. A pool in which n (n is an integer of one or more) RAID groups belong is explained as an example. In the following, each RAID group belonging to this pool is referred to as RG #1, RG #2, . . . , RG # n. Also, the real capacity of RG # i is denoted as Ri (where i is an integer satisfying $1 \le i \le n$). Also, the sum total of the logical volume of the pool VOL possessed by RG # i is expressed as Vi. At this time, the real capacity P of this pool is defined by the following expression (1).

[Expression 1]

$$P=\Sigma_{k=1}^{n}\text{Min}(R_k,V_k) \qquad (1)$$

The notation "Min (A, B)" in expression (1) indicates the smaller value of either A or B.

In other words, by obtaining the minimum value of the sum of the real capacity of the RAID group and the logical capacity of the pool VOL for each RAID group belonging to the pool and calculating the sum of the values obtained for each RAID group, the real capacity of the pool may be calculated. In the case where there is one RAID group belonging to the pool, and when the total logical capacity of the pool VOL is smaller than the real capacity of the RAID group, the total logical capacity of the pool VOL is the real capacity of the pool. If the sum of the logical volumes of the pool VOL is larger than the real capacity of the RAID group, the real capacity of the RAID group becomes the real capacity of the pool.

In cases where the pool VOL is constituted by a drive 114 that does not have the compression function, or is constituted by the compression drive 113, the calculation method of the real capacity P of the pool is obtained according to the above equation (1). However, in a RAID group consisting of drives 114 that do not have compression functions, the relationship of $Ri \geq Vi$ is always satisfied. Therefore, if there is a pool that only belongs to a LDEV composed of drives 114 that do not have the compression function, the real capacity of the pool can be obtained by calculating the sum of the logical capacities of the pool VOL.

The logical usage of the pool is the sum of pages in the pool that are in use. The real usage amount of the pool is the total size of the physical areas of the compression drive 113 mapped to all of the in-use pages in the pool.

Similar to the logical capacity and the like of the RAID group, the logical capacity, real capacity, logical usage amount and real usage amount of the pool also include the size of the parity stripe. However, as another embodiment, a definition may be adopted for the logical capacity in which the size does not include the size of the parity stripe, real capacity, logical usage amount, or real usage amount of the pool.

Figures 6, 7:
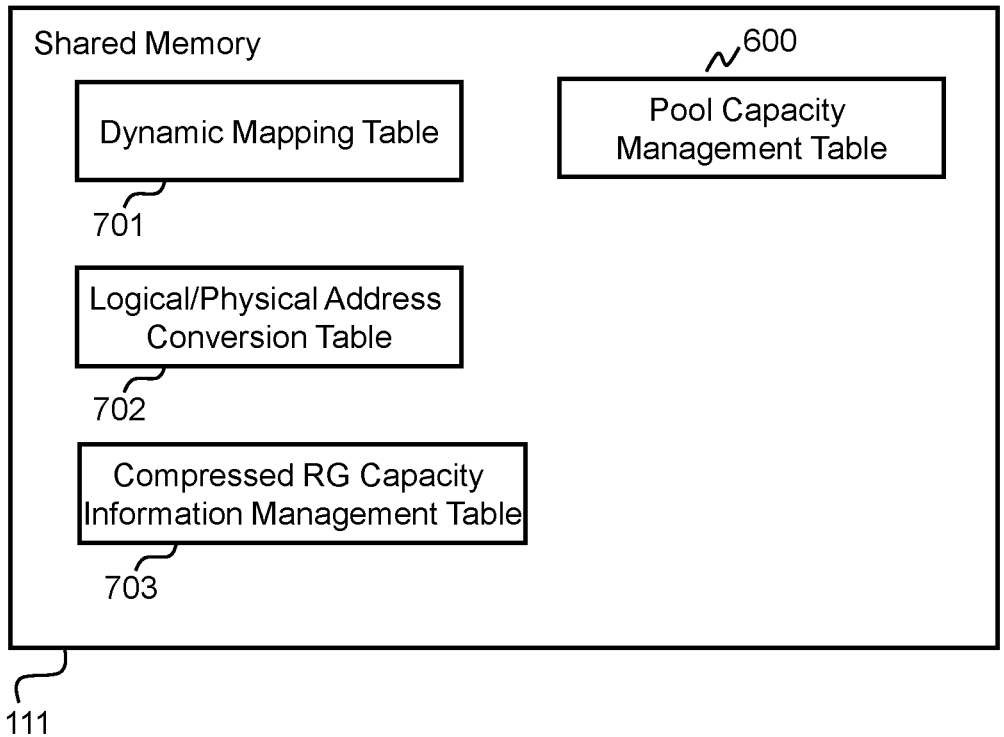
FIG. 6 is a diagram illustrating main management information used in the storage system.
FIG. 7 is a configuration example of a dynamic mapping table.

Next, the contents of the main management information used in the storage system 104 according to the present embodiment will be described. As shown in FIG. 6, the storage system 104 may include a dynamic mapping table 701, a logical/physical address conversion table 702, a compressed RG capacity information management table 703, and a pool management table 600 in the shared memory 111.

FIG. 7 illustrates an example of the dynamic mapping table 701. The dynamic mapping table 701 is a table for managing information on virtual pages possessed by the storage system 104. In each row (record) of the dynamic mapping table 701, attribute information of a virtual page is stored. Each virtual page includes a pool number (701-1), a virtual volume number (701-2), a virtual page number (occasionally denoted as a virtual page #) (701-3), a host LBA (701-4), a pool volume number (701-5), and a page # (701-6).

The virtual volume number (701-2) is an identification number of the virtual volume to which the virtual page belongs, and the virtual page # (701-3) is an identification number of the virtual page. The host LBA (701-4) is the host LBA of the top block of the virtual page. The pool number (701-1) represents an identification number of the pool to which the virtual page belongs. The pair of the pool volume number (701-5) and the page # (701-6) is attribute information for the page mapped to the virtual page. When a page is not mapped to the virtual page, an invalid value (NULL) is stored in the pool volume number (701-5) and the page #(701-6). When the storage system 104 receives a write request for the virtual page from the host 101 and selects a page to be mapped to the virtual page, the page number of the selected page and the identifier (pool volume number) of the logical device to which the page belongs are respectively recorded to the page # (701-6) and the pool volume number (701-5).

Figure 8:
FIG. 8 is a configuration example of a logical/physical address conversion table (LP conversion table).

FIG. 8 illustrates an example of the logical/physical address conversion table 702. The logical/physical address conversion table 702 is a table for managing the attribute information of the page. In each record of this table, information on the RAID group and the storage device associated with the page managed by the storage system 104 is stored. The logical/physical address conversion table 702 is a table provided for each pool. Therefore, when n storage pools are provided in the storage system 104, n logical/physical address conversion tables 702 are defined in the storage system 104. The logical/physical address conversion table 702 is also called an LP conversion table 702.

Each record in the logical/physical address conversion table 702 indicates that the page specified by the pool volume number (702-1) and page # (702-2) belongs to the RAID group specified by the RG number (702-3). The identification numbers of all the storage devices constituting the RAID group to which the page belongs are stored in the drive number (702-4). The start address (702-5) represents the address of the storage device corresponding to the start position in the page.

In the storage system 104 according to the present embodiment, the LDEV is added to the pool by the user providing an instruction from the management server 102. Or the storage system 104 may add the LDEV according to the state of the pool. When it is determined that the LDEV is added to the pool, the storage system 104 registers information of all the pages included in the LDEV to be added in the logical/physical address conversion table 702. Conversely, when the LDEV is deleted from the pool, the storage system 104 deletes information of all pages included in the LDEV to be deleted from the logical/physical address conversion table 702. Details of this processing will be described later.

Next, an example of the compressed RG capacity information management table 703 will be described with reference to FIG. 9. The compressed RG capacity information management table 703 is a table for managing information of the RAID groups (compressed RGs composed of compression drives 113. In the compressed RG capacity information management table 703, only the information of the compressed RG providing the storage areas in the pool among the compressed RGs is stored.

In each record of the compressed RG capacity information management table 703, attribute information of a compressed RG providing the storage areas in the pool is stored. The RG number 703-1 is an identification number of the compressed RG, and the pool VOL capacity sum 703-2 is the total value of the logical capacities of the LDEVs (pool VOL) belonging to the pool among the LDEVs in the compressed RG.

In the real capacity within the pool 703-3, the smaller one of either the real capacity of the compressed RG or the total value of the logical capacities of the LDEVs belonging to the pool among the compressed RG LDEVs is stored.

The real usage amount 703-4 is the real usage amount of the compressed RG. The relocation request bit 703-5 is information indicating that the relocation processing, which will be described later, is necessary. In the relocation request bit 703-5, the later-described compressed RG monitor program 803 stores information. When there is a compressed RG requiring relocation processing, "1" is stored in the relocation request bit 703-5 of the compressed RG, and a "0" is stored in the relocation request bit 703-5 of the compressed RGs if otherwise. The initial value of the relocation request bit 703-5 is "0". A state in which "1" is stored in the relocation request bit 703-5 is also referred to as the relocation request bit 703-5 being in the "ON" state. Conversely, a state where "0" is stored in the relocation request bit 703-5 is also referred to as the relocation request bit (703-5) being in the "OFF" state.

In the above description, management information used for management of the virtual volumes and compressed RGs has primarily been described. The logical devices and the RAID groups (belonging to the pool) used for forming the virtual volume are managed by the LP conversion table 702, the compressed RG capacity information management table 703, and the like. However, information (capacities, information on the storage devices used for configuring the RAID group, and the like) for managing the configuration of the logical device and the RAID group not belonging to the pool is not managed in the LP conversion table 702 or the compressed RG capacity information management table 703. In addition to the above-described management information, the storage system 104 also stores information (referred to as configuration information) for managing the configuration of the RAID groups and the logical devices in the shared memory 111, and the logical information for the configurations of logical devices and RAID groups not belonging to the pool may be managed with this configuration information. Since these pieces of information are known, the explanation thereof is omitted herein.

(4) Threshold Value and Pool Management

The storage system 104 according to the present embodiment manages the logical capacity, the real capacity, the logical usage amount, and the real usage amount of the pool. FIG. 10 illustrates the contents of the pool capacity management GUI 600' displayed on the display of the management server 102. In the pool capacity management GUI 600', a state 606, a logical capacity 607, a logical usage amount 608, a real capacity 609, and a real usage amount 610 are displayed for each pool. In addition, a logical capacity 601 and a real capacity 602 represent the total of the logical capacities and the real capacities of all the pools of the storage system 104, respectively. A virtual VOL capacity 603 is the sum of the capacities (logical capacities) of all the virtual volumes defined in the storage system 104. The number of pools 604 represents the total number of pools held by the storage system 104.

When the logical usage amount of a pool exceeds a predetermined threshold value (logical usage amount threshold) or when the real usage amount of the pool exceeds a predetermined threshold value (real usage amount threshold), the storage system 104 issues a notification (warning) to the management server 102. Upon receiving the notification, the management server 102 performs processing to increase the capacity of the pool. In the present embodiment, the logical usage threshold value and the real usage threshold value may be set to 80%. That is, when the logical usage amount of the pool exceeds 80% of the logical capacity of the pool, or when the real usage amount of the pool exceeds 80% of the real capacity of the pool, the storage system 104 issues a warning to the management server 102.

When the logical usage amount of the pool exceeds 80% of the logical capacity of the pool, the management server 102 displays "logical usage amount threshold value exceeded" in the state 606 of the pool. Also, when the real usage amount of the pool exceeds 80% of the real capacity of the pool, the management server 102 displays "real usage amount threshold value exceeded" in the state 606 of the pool. Note that this is only an example, and the threshold value may be a value other than 80%. Also, the logical usage amount threshold value and the real usage amount threshold value may be different from each other.

In the storage system 104 according to this embodiment, when the real usage amount of a certain compressed RG belonging to the pool exceeds the predetermined threshold value, part of the data in the compressed RG is transferred to another RAID group in the pool (a relocation). This predetermined threshold value may be different from or the same as the threshold value of the usage amount (real usage amount or logical usage amount) of the pool. In the present embodiment, this predetermined threshold value is also set to 80%, but a value other than 80% may be used as this threshold value.

Note that the storage system 104 stores and manages information of the pool ID 605, the state 606, the logical capacity 607, the logical usage amount 608, the real capacity 609, and the real usage amount 610 among the contents displayed on the pool capacity management GUI 600' in the pool management table 600.

(5) Programs Executed in the Storage System

Next, various programs executed by (the processor 119 of) the storage system 104 will be described. In the storage system 104, at least a host write processing program 802, a compressed RG monitoring program 803, a destage processing program 804, an exhaustion avoidance relocation processing program 805, a page relocation processing program 806, a pool capacity expansion program 807, and a pool capacity reduction program 808 are executed. The processing flow of these programs will be described below.

Note that in the storage system 104, programs other than the programs listed above are also executed. As described above, (the processor 119 of) the storage system 104 may execute programs for defining virtual volumes, RAID groups, pools and logical devices as well as creating and maintaining management information for managing them, and performing processing to provide virtual volumes to the host 101. Also, when the storage system 104 receives a read request (read command) for a virtual volume from the host 101, the processor 119 executes a program (host read processing program) for processing the read request. However, since the processing performed by these programs is known, the description thereof will be omitted in this specification.

Figure 11:
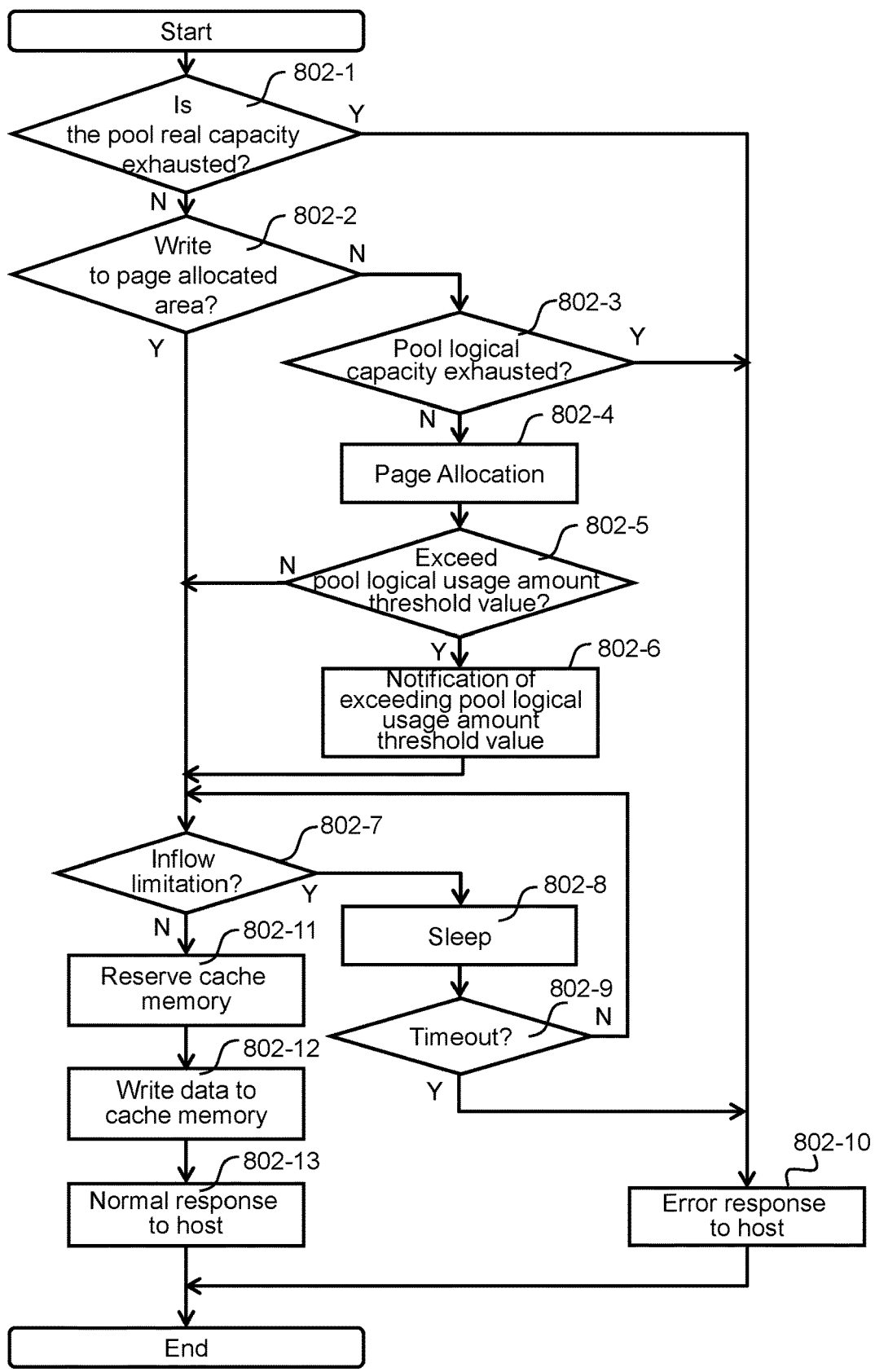
FIG. 11 is a flowchart of a host write processing program.

First, the flow of processing (write processing) when the storage system 104 receives a write request and write data for a virtual volume from the host 101 will be described with reference to FIG. 11. When a write request arrives at the storage system 104, the host write processing program 802 is executed by the processor 119. The write request issued by the host 101 includes the identification number of the virtual volume to which the write data is written, and information on the write position of the write data (the host LBA and the data length on the virtual volume).

In Step 802-1, the host write processing program 802 refers to the pool capacity management table 600 and determines whether the real capacity of the pool to which the virtual volume to be written belongs is exhausted. "The real capacity is exhausted" refers to a state in which the difference (free capacity) between the real capacity and the real usage amount becomes 0, and the area (physical area) for writing the write data to the pool is depleted. Note that when the real capacity of the pool is exhausted, the logical capacity may be exhausted or the logical capacity may not be exhausted.

When the real capacity of the pool is exhausted (Step 802-1: Y), the host write processing program 802 reports an error to the host 101 (Step 802-10) and ends the processing. When the real capacity of the pool is not exhausted (Step 802-1: N), the host write processing program 802 may executes Step 802-2.

In Step 802-2, the host write processing program 802 identifies a virtual page as the write destination of the write data (calculates the virtual page number) from the information on the write destination position included in the write request.

In Step 802-2, the host write processing program 802 refers to the dynamic mapping table 701 to determine whether or not a page is allocated to the specified virtual page. When a valid value (non-NULL value) is stored in the page # (701-6) of a record whose virtual volume number (701-2) and virtual page # (701-3) in the dynamic mapping table 701 are equal to the identified virtual page number, this indicates that a page is allocated to the identified virtual page.

If no page is assigned to the virtual page (Step 802-2: N), the host write processing program 802 refers to the pool capacity management table 600 and determines whether the logical capacity of the pool to which the write target virtual volume belongs is exhausted (Step 802-3). "Logical capacity is exhausted" refers to a state in which the difference (free capacity) between the logical capacity and the logical usage amount becomes 0, and the area (page) for writing the write data to the pool is depleted. When the logical capacity of the pool is exhausted (Step 802-3: Y), the host write processing program 802 reports an error to the host 101 (Step 802-10) and ends the processing. If the logical capacity of the pool is not exhausted (Step 802-3: N), then Step 802-4 is executed.

In Step 802-4, the host write processing program 802 selects an unused page and allocates the selected page to the write target virtual page. In particular, the host write processing program 802 selects one set of information on the page which has not yet been registered in the dynamic mapping table 701 from among the page information (a set of pool volume number (702-1) and page # (702-2)) recorded in the LP conversion table 702. Then, the host write processing program 802 records the information of the selected page in the record corresponding to the write target virtual page in the dynamic mapping table 701. Further, as the page is allocated to the virtual page, the usage amount (logical usage amount) of the pool changes, so the host write processing program 802 also updates the contents of the pool capacity management table 600.

After execution of Step 802-4, the host write processing program 802 refers to the pool capacity management table 600 and determines whether or not the logical usage amount of the pool to which the write target virtual volume belongs has exceeded the threshold value (Step 802-5). When the logical usage amount of the pool exceeds the threshold value (Step 802-5: Y), the host write processing program 802 notifies the management server 102 that the logical usage amount of the pool exceeds the threshold value (Step 802-6).

In addition to this warning, the management server 102 is also notified of the identification number of the pool whose real usage amount exceeds the threshold value. When the logical usage amount of the pool does not exceed the threshold value (Step 802-5: N), Step 802-6 is not executed.

By executing page allocation (Step 802-4), the storage destination storage device(s) of the write target data may be uniquely identified. In Step 802-7, the host write processing program 802 acquires the real capacity and real usage amount of the storage device from the storage device in which the write target data is stored, and calculates the real free capacity (the difference between the real capacity and the real usage amount) of the storage device in which the write target data is stored. When the write target data is large and stored in a plurality of storage devices, the host write processing program 802 may calculates the free real capacity for each of the plurality of storage devices. In addition, the host write processing program 802 may identify the write destination storage device of each dirty data (data on the cache memory 110 for which data has not yet been written to the storage device) on the cache memory 110, and calculate the amount of dirty data for each storage device in which the write target data is stored.

When the free real capacity of the storage device storing the write target data is equal to or less than the dirty data amount to be written in the storage device, in some cases it is not possible to write all the dirty data in the storage device. For example, such a situation can occur when the data size hardly changes after compression. Accordingly, in this case (Step 802-7: Y), the host write processing program 802 does not store the write target data in the storage system 104 (the cache memory 110) until the free real capacity of the storage device storing the write target data becomes larger than the dirty data amount to be written in the storage device.

Also, in the processing of Step 802-7, the host write processing program 802 may calculate the free real free capacity and the dirty data amount not for each storage device, but for each RAID group.

If the determination at Step 802-7 is affirmative, the host write processing program 802 may sleep for a certain period of time (Step 802-8). The processes of Step 802-7 and Step 802-8 are collectively referred to as inflow limitation. The destage processing program 804 executed independently of the host write processing program 802 may store the dirty data in the cache memory 110 in the storage device while stopping the processing in step 802-8. Then, since the dirty data amount decreases, when the host write processing program 802 makes the determination again at Step 802-7, the inflow limitation becomes unnecessary and the write request of the host 101 can be accepted.

In Step 802-9, the host write processing program 802 may determine whether or not the time to return the timeout error to the host 101 has been reached. If the determination at Step 802-9 is affirmative as a result of sleep occurring a plurality of times in Step 802-8, the host write processing program 802 may report an error to the host 101 (Step 802-10). If the determination in Step 802-9 is negative, the host write processing program 802 may again execute Step 802-7.

If the determination at Step 802-7 is negative, that is, if the free real capacity of the storage device in which the write target data is stored is larger than the dirty data amount to be written in the storage device, inflow limitation is unnecessary, and Step 802-11 is executed. In Step 802-11, the host write processing program 802 may reserve an area of the cache memory 110 for storing the write target data, and in Step 802-12, stores the write target data in the area on the reserved cache memory 110. In Step 802-12, the host write processing program 802 may also generate the parity of the RAID group. In Step 802-11, the host write processing program 802 may also reserve an area on the cache memory 110 for storing the parity, and store the generated parity in the cache memory 110 in Step 802-12.

Thereafter, the host write processing program 802 responds to the host 101 that the write processing has been completed normally (Step 802-13), and ends the processing. Step 802-7, Step 802-8, and Step 802-9 are executed only when the page in which the write target data is stored is constituted by compression drives 113. If the page in which the write target data is stored is not constituted by compression drives 113, Steps 802-7, 802-8, and 802-9 are not executed. In the above description, parity generation is performed in Step 802-12. However, as another embodiment, parity generation may be performed after Step 802-13.

The storage system 104 according to the present embodiment uses the cache memory 110 as a write-back cache, as it is known. Accordingly, at a point in time when the write target data stored in the cache memory 110 is not stored in the storage device, the response is returned to the host 101 (Step 802-13). The write target data written in the cache memory 110 in Step 802-12 is written in the storage device by the destage processing program 80,4 which is executed independently of the host write processing program 802. The process of writing data in the cache memory 110 to the storage device is called destage processing. In the storage system 104, destage processing is performed by executing the destage processing program 804. The processor 119 executes the destage processing program 804 at regular intervals (for example, once every ten minutes).

Figure 12:
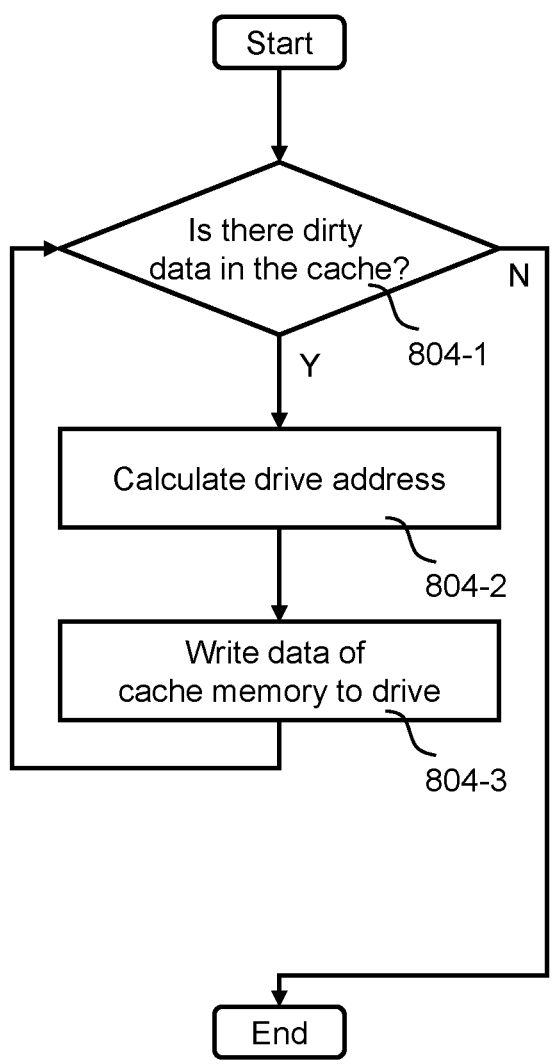
FIG. 12 is a flowchart of a destage processing program.

With reference to FIG. 12, the flow of processing performed by the destage processing program 804 will be described. When the destage processing program 804 is started, the destage processing program 804 may determine whether there is dirty data in the cache memory 110 or not. If there is no dirty data (Step 804-1: N), the destage processing program 804 ends the process.

When there is dirty data (Step 804-1: N), the destage processing program 804 specifies the storage device to which the dirty data is written and the write destination address on the storage device (Step 804-2). When storing the write data from the host 101 in the cache memory 110, the storage system 104 also stores the information (information such as the host LBA or the page number which can uniquely identify the write destination storage device) of the write destination position of the write data (dirty data) in the cache memory 110 or the shared memory 111. In Step 804-2, the write destination address of the dirty data may be identified using this information.

Then, the destage processing program 804 writes the dirty data to the calculated address (Step 804-3). When there is a large amount of dirty data, the destage processing program 804 may repeatedly executes Steps 804-1 to 804-3, and terminate the processing when the dirty data is depleted (Step 804-1: N).

(6) Processing for the Compression Drive

Figure 13:
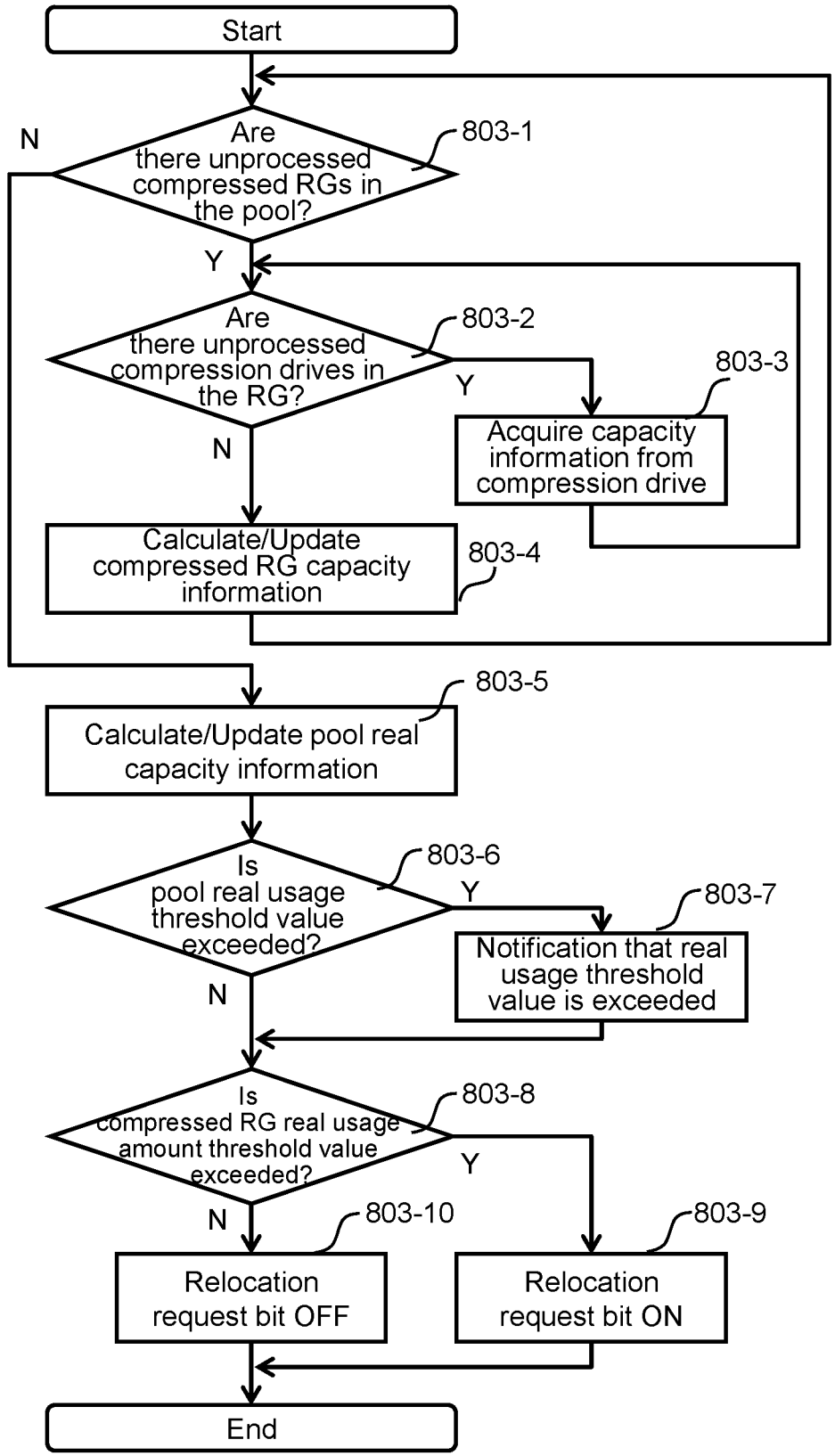
FIG. 13 is a flowchart of a compressed RG monitoring program.

Next, a flow of processing executed by the compressed RG monitoring program 803 will be described with reference to FIG. 13. The compressed RG monitor program 803 may be a program for calculating the real usage amount of the pool and the real usage amount of the RAID groups belonging to the pool. The compressed RG monitoring program 803 may be periodically activated. The compressed RG monitoring program 803 may be executed for each pool defined in the storage system 104. Hereinafter, the flow of the processing of the compressed RG monitoring program 803 executed for a specific single pool will be described.

When the compressed RG monitoring program 803 is activated, the compressed RG monitoring program 803 may determine whether there are compressed RGs which have not yet been processed in Step 803-4 among the compressed RGs belonging to the pool (Step 803-1). If there are compressed RGs that have not yet been processed in Step 803-4 (Step 803-1: Y), the compressed RG monitoring program 803 selects one compressed RG not yet processed in Step 803-4.

In Step 803-2, the compressed RG monitoring program 803 refers to the LP conversion table 702, thereby specifying each compression drive 113 constituting the selected compressed RG. Then, the compressed RG monitoring program 803 may determine whether or not there are storage devices whose processing in Step 803-3 has not yet been performed among the identified storage devices.

When there are storage devices for which the processing of Step 803-3 has not yet been performed (Step 803-2: Y), the compressed RG monitor program 803 may issue a capacity information acquisition request to the compression drive 113, and capacity information may be acquired from the compression drive 113 (Step 803-3). When receiving the capacity information acquisition request from the compressed RG monitoring program 803 (which the processor 119 executes), the compression drive 113 returns the capacity information to the processor 119.

The capacity information returned by the compression drive 113 is the size of the physical area (the sum of the sizes of the assigned code words) mapped to the segments in the logical address space 400. When the compression drive 113 receives the capacity information acquisition request, it returns information regarding the size of the physical area mapped to the segment to all segments in the logical address space 400 (put differently, when the area on the physical address space 450 is not allocated to the segments, information indicating that the size of the physical area mapped to the segments is 0 KB is returned).

The compressed RG monitoring program 803 uses the capacity information returned from the compression drive 113, the LP conversion table 702, and the dynamic mapping table 701 to calculate the real usage amount of the compressed RG, and updates the contents of the compressed RG capacity information management table 703 (Step 803-4). When the processing of Steps 803-2 to 803-4 has been performed for all the compressed RGs belonging to the pool (Step 803-1: N), the compressed RG monitoring program 803 updates the real usage amount 610 and the real capacity 602 in the pool capacity management table 600 (Step 803-5).

The processes performed in Steps 803-4 and 803-5, in particular the method of calculating the real usage amount, will be outlined herein. In Step 803-4, first, the compressed RG monitoring program 803 may identify the LDEVs which are the pool VOLs among the LDEVs included in the compressed RG. This is identified by referring to the pair of the pool volume number (702-1) and the RG number (702-3) registered in the LP conversion table 702. Further, the compressed RG monitoring program 803 may identify at which position (address) each page in the identified LDEV is located in the storage device. This can be identified by referring to the drive number (702-4) and the start address (702-5) of the LP conversion table 702 for each page. By using the information obtained here, the dynamic mapping table 701, and the capacity information obtained in Step 803-3, the total size of the physical areas mapped to the in-use pages in the compressed RG (that is, the real usage amount of the compressed RGs) can be obtained.

Also in Step 803-5, the compressed RG monitoring program 803 can obtain the total size (the real usage amount of the pool) of the physical area mapped to the in-use page in the pool in the same way as the above-described method.

After calculating the real usage amount of the pool and the real usage amount of the compressed RGs belonging to the pool, the compressed RG monitoring program 803 may determine whether or not the real pool usage amount exceeds the threshold value. When the real pool usage amount exceeds the threshold value (Step 803-6: Y), the compressed RG monitoring program 803 may modify the state 606 of the pool management table 600 to "real usage amount threshold value" and issues a warning to the management server 102 that the usage exceeds the threshold value (Step 803-7). In addition to this warning, the management server 102 is also notified of the identification number of the pool whose real usage amount exceeds the threshold value. When the real pool usage amount exceeds the threshold value (Step 803-6: N), Step 803-7 is not performed.

Subsequently, the compressed RG monitoring program 803 may determine whether or not there is a compressed RG among the compressed RGs belonging to the pool whose real usage amount exceeds the threshold value. When there is a compressed RG exceeding the threshold value (Step 803-8: Y), the compressed RG monitoring program 803 may set the relocation request bit (703-5) of the compressed RG to "1", and for compressed RGs not exceeding the threshold value (Step 803-8: N), the compressed RG monitoring program 803 may set the relocation request bit (703-5) of the compressed RG to "0" and ends the processing.

Figure 14:
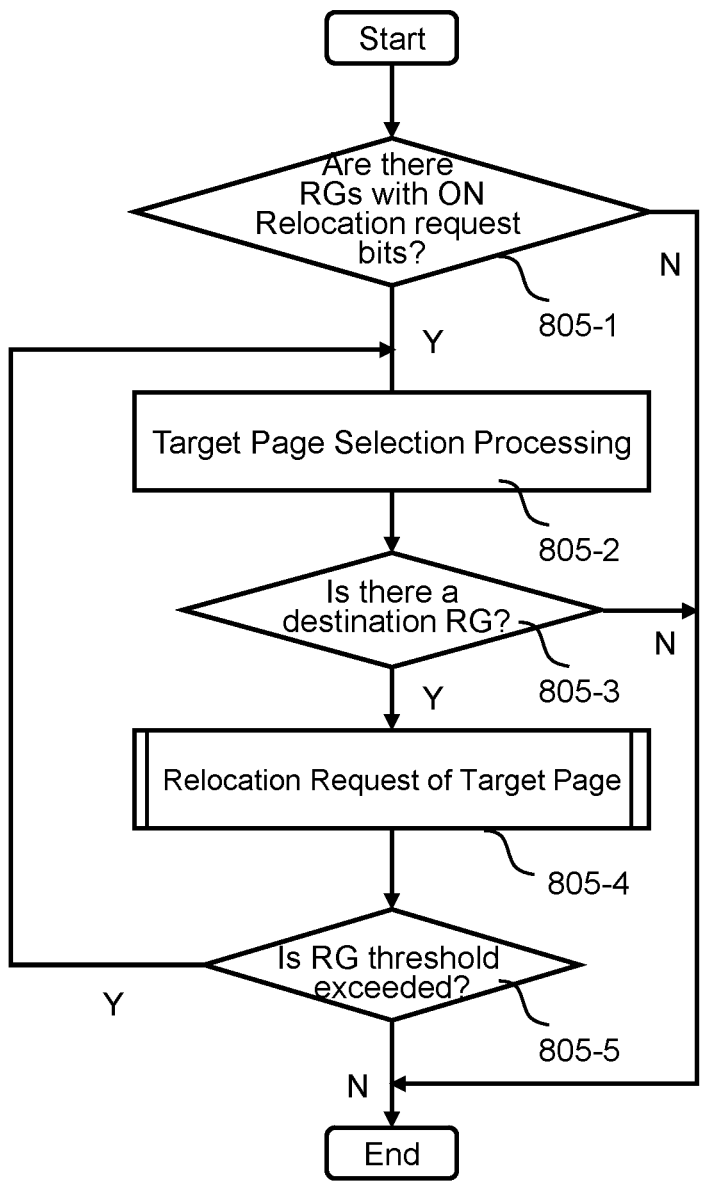
FIG. 14 is a flowchart of an exhaustion avoidance relocation processing program.

Subsequently, a flow of processing executed by the exhaustion avoidance relocation processing program 805 will be described with reference to FIG. 14. The exhaustion avoidance relocation processing program 805 may be periodically activated.

When the exhaustion avoidance relocation processing program 805 is initiated, the exhaustion avoidance relocation processing program 805 may refer to the compressed RG capacity information management table 703, and determine whether or not there is a compressed RG for which the relocation request bit (703-5) is "1". When there is no compressed RG for which the relocation request bit (703-5) is "1" (Step 805-1: N), the exhaustion avoidance relocation processing program 805 ends the processing. When there is a compressed RG for which the relocation request bit (703-5) is "1" (Step 805-1: Y), the exhaustion avoidance relocation processing program 805 performs a process of moving the in-page data of the compressed RGs whose relocation request bit (703-5) is "1" to another RAID group. Hereinafter, the compressed RGs for which the relocation request bit (703-5) is "1" are referred to as "target RGs".

When there is a compressed RG for which the relocation request bit (703-5) is "1" (Step 805-1: Y), the exhaustion avoidance relocation processing program 805 may select one page from the target RG. The page to be selected may be any page as long as it is a page mapped to the virtual page. Alternatively, as another embodiment, the exhaustion avoidance relocation processing program 805 may select a page with a low access frequency. When the compression drive 113 is an SSD using a high-speed flash memory or the like and the drive 114 is an HDD having a lower speed than the SSD, the user can define a pool in which pages belonging to RAID groups constituted by compression drives 113 and pages belonging to RAID groups constituted by drives 114 are mixed. Such a pool is called a hierarchical pool. In a case where a hierarchical pool is used, the storage system 104 may retain the result of counting the frequency of read/write requests from the host 101 for each page as read/write frequency information in the shared memory 111, and execute a program for moving pages according to the read/write frequency. When selecting a page from the hierarchical pool, the exhaustion avoidance relocation processing program 805 may select, by referring to the read/write frequency information, a page having a low read/write frequency among the pages belonging to the RAID group formed by the compression drives 113.

Subsequently, the exhaustion avoidance relocation processing program 805 may determine whether there is a RAID in the pool group capable of moving the data in the page selected in Step 805-2 in the pool (Step 805-3). In particular, the exhaustion avoidance relocation processing program 805 may determine whether there is a RAID group having unused pages by referring to the dynamic mapping table 701 and the LP conversion table 702. If such a RAID group exists, this RAID group is determined as the RAID group capable of moving the data.

When there is no RAID group capable of moving the data (Step 805-3: N), the exhaustion avoidance relocation processing program 805 may end the processing. When there is a RAID group capable of moving data (Step 805-3: Y), the exhaustion avoidance relocation processing program 805 may call the page relocation processing program 806 and transfer the data in the page selected in Step 805-2 (Step 805-4). Details of Step 805-4 will be described later.

After Step 805-4, the exhaustion avoidance relocation processing program 805 may recalculate the real usage amount of the target RG and update the contents of the compressed RG capacity information management table 703. For example, the same processing as in Steps 803-3 and 803-4 may be performed. As a result, when the real usage amount of the target RG is lower than the threshold value (Step 805-5: N), the exhaustion avoidance relocation processing program 805 may ends the processing. When the real usage amount of the target RG is not lower than the threshold value (Step 805-5: Y), the exhaustion avoidance relocation processing program 805 may repeat the processing from Step 805-2.

Figure 15:
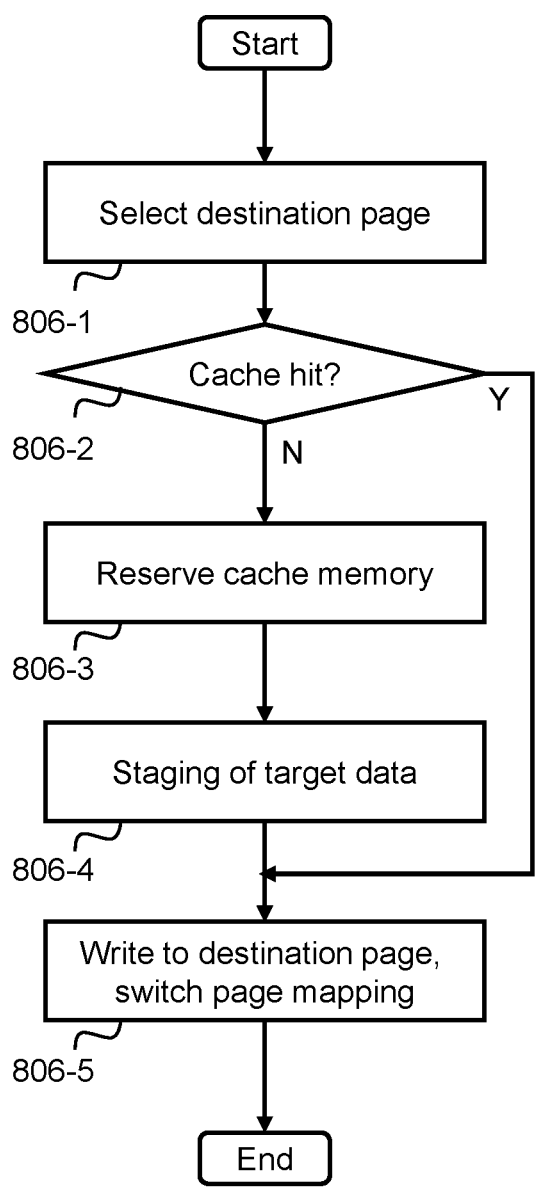
FIG. 15 is a flowchart of a page relocation processing program.

Next, the flow of processing in Step 805-4 will be described with reference to FIG. 15. FIG. 15 is a flowchart of processing executed by the page relocation processing program 806.

First, the page relocation processing program 806 may select a destination page for the data (Step 806-1). In particular, the page relocation processing program 806 may select one unused page from a pool VOL belonging to the same pool as the pool to which the page selected in Step 805-2 belongs. However, the pool VOL having the page selected here should be included in a RAID group other than the RAID group to which the page selected in Step 805-2 belongs.

In Step 806-2, the page relocation processing program 806 may determine whether the data of the page selected in Step 805-2 is stored in the cache memory 110. When the data of the page selected in Step 805-2 is not stored in the cache memory 110 (Step 806-2: N), the page relocation processing program 806 reserves an area for one page in the cache memory 110 (Step 806-3), and the data of the page selected in Step 805-2 is read out from the storage device and stored in the secured area (Step 806-4).

After the Step 806-4 or when the data of the page selected in Step 805-2 is stored in the cache memory 110 (Step 806-2:

Y), the page relocation processing program 806 may write the data of the page selected in Step 805-2 to the page (storage device) selected in Step 806-1, and update the dynamic mapping table 701 and the LP conversion table 702 (Step 806-5). When Step 806-5 is completed, the page relocation processing program 806 may end the processing.

An example will be described in which the mapping destination of the page selected in Step 805-2 has a virtual volume number=n, a virtual page number=m, the page number of the page selected in Step 806-1 is k, and the logical device (pool volume) to which this page belongs (pool Volume) is j. In this case, in Step 805-5, processing is performed to store j in a pool volume number (701-5) of the row whose virtual volume (701-2) number is n and whose virtual page #(701-3) is m in the dynamic mapping table 701, and store k in the page #(701-6).

In the above example, the data read out in Step 806-4 is immediately written in the storage device in Step 806-5, but in Step 806-5, the data is not written in the storage device but may be stored and remain in the cache memory 110. In that case, however, it is necessary to destage the data remaining in the cache memory 110 at a later time. Accordingly, it is necessary for the storage system 104 to manage the relocation target data remaining in the cache memory 110 as the dirty data.

(7) Capacity Management in the Management Server

Figure 16:
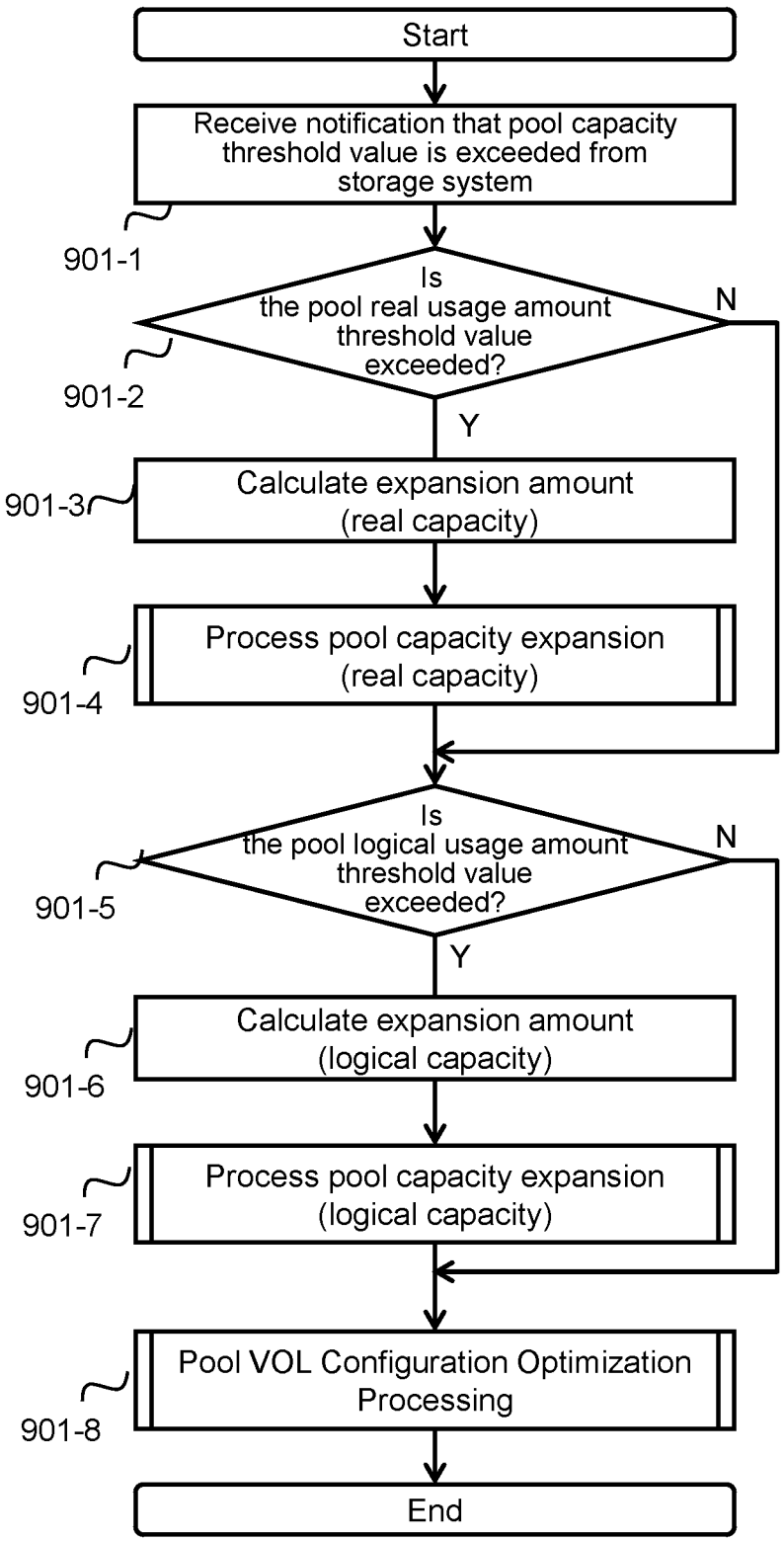
FIG. 16 is a flowchart of the pool capacity management program.

Next, a flow of processing executed by the management server 102 notified of the warning from the storage system 104 will be described. At least in the management server 102, the pool capacity management program 901, the pool VOL configuration optimization program 902, and the pool capacity expansion automation program 903 are executed. The pool capacity management program 901 may be executed in response to receiving a warning (notification) from the storage system 104 indicating that the logical usage amount or the real usage amount exceeds the threshold value. The pool VOL configuration optimization program 902 and the pool capacity expansion automation program 903 are each called by the pool capacity management program 901. FIG. 16 is a flowchart of the pool capacity management program 901 executed by the management server 102.

In response to receiving a warning (notification) from the storage system 104 that the logical usage amount or the real usage amount exceeds the threshold value (Step 901-1), the pool capacity management program 901 may perform the processing from Step 901-2 onward. The warning received in Step 901-1 may be notified to the management server 102 by executing the above-described Step 802-6 and Step 803-7 in the storage system 104. In addition, as the identification number of the pool that exceeds the threshold value (of the real usage amount or logical usage amount) is also provided along with the received warning, the pool capacity management program 901 may perform processing such as expansion of the logical capacity or the real capacity for the pool identified by the notified identification number in and after Step 901-2.

When the warning received at Step 901-1 is a warning that the real pool usage exceeds the threshold value (Step 901-2: Y), the pool capacity management program 901 acquires the management information possessed by the storage system 104 from the storage system 104 and calculates the real capacity (hereinafter referred to as a "real capacity increment") to be expanded based on the acquired management information (Step 901-3). In addition to the pool management table 600, the management information includes the logical/physical address conversion table 702, the compressed RG capacity information management table 703, and the configuration information of all the LDEVs and all the RAID groups possessed by the storage system 104.

An example of the method of calculating the real capacity increment in Step 901-3 is as follows. The pool capacity management program 901 may calculate a real capacity that is at least enough to eliminate, as a real capacity increment, the real capacity threshold excess state. For example, let C be the real pool capacity, U be the real usage amount, T % be the threshold value, and ΔC be the real capacity increment at the time when the real pool usage exceeds the threshold value. In this case, in order to ensure that the real pool usage amount below the threshold value, the real pool capacity (C+ΔC) should satisfy the following expression (2).

[Expression 2]

$$(C+\Delta C) \times T \div 100 > U \quad (2)$$

From the above equation, the pool capacity management program 901 may determine a real capacity increment ΔC that satisfies the following equation (3).

[Expression 3]

$$\Delta C > U \times 100 \div T - C \quad (3)$$

For example, if C=100, U=90, and T=80%, then ΔC>12.5.

Subsequently, the pool capacity management program 901 calls the pool capacity expansion automation program 903 to instruct the storage system 104 to expand the pool capacity (Step 901-4). Details of the processing performed in step 901-4 will be described later. If the determination at Step 901-2 is negative, Steps 901-3 and 901-4 are not performed.

When the warning received in Step 901-1 is a warning that the pool logical usage amount exceeds the threshold value (Step 901-5: Y), the pool capacity management program 901 acquires the management information possessed by the storage system 104, from the storage system 104, and calculates the logical capacity to be expanded (hereinafter referred to as "logical capacity increment") (Step 901-6). Incidentally, the logical capacity increment calculated in Step 901-6 can also be obtained in the same way as the method of calculating the real capacity increment. That is, the pool capacity management program 901 may calculate, as a logical capacity increment, a logical capacity that is at least enough to eliminate the state of exceeding the logical capacity threshold.

Then, the pool capacity management program 901 calls the pool capacity expansion automation program 903 to instruct the storage system 104 to expand the logical capacity of the pool (Step 901-7). It should be noted that the pool capacity expansion automation program 903 is called both at the time of execution of Step 901-4 and at the time of execution of Step 901-7. Details of the processing performed by the pool capacity expansion automation program 903 will be described later. If the determination in step 901-5 is negative, Steps 901-6 and 901-7 will not be performed.

Finally, the pool capacity management program 901 calls the pool VOL configuration optimization program 902 to optimize the pool volume (Step 901-8). Upon completion of Step 901-8, the pool capacity management program 901 may end the processing. Details of the processing performed by the pool VOL configuration optimization program 902 will be described later.

Figure 17:
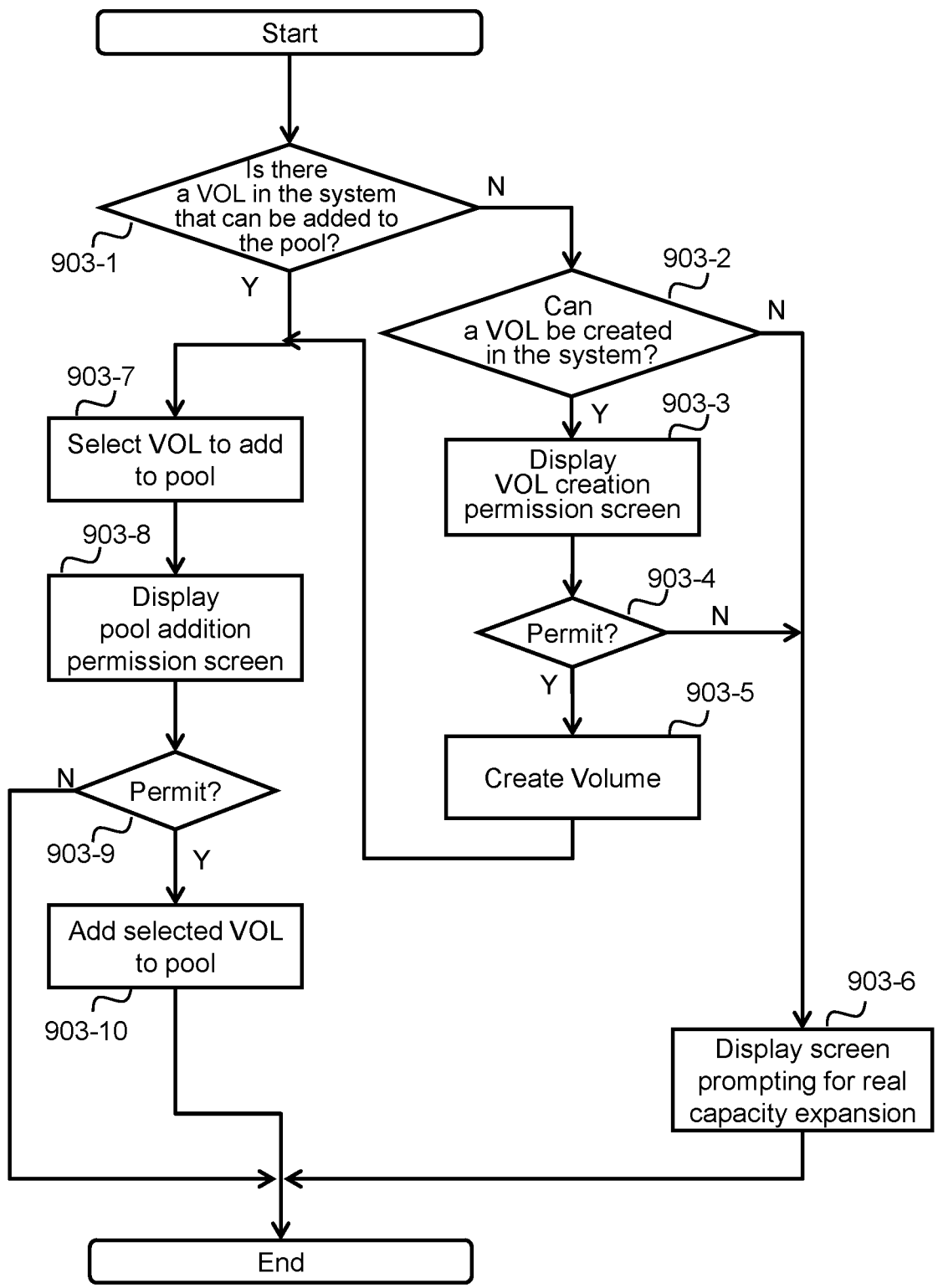
FIG. 17 is a flowchart of the pool capacity expansion automation program.

Next, with reference to FIG. 17, description will be provided regarding the flow of the processing executed in Step 901-4 or Step 901-7; that is, the processing performed by the pool capacity expansion automation program 903.

The pool capacity expansion automation program 903 may determine whether there is an unused LDEV that can satisfy the increment (real capacity increment or logical capacity increment) obtained in Step 901-3 or Step 901-6 (Step 903-1). Here, an "unused LDEV" refers to an LDEV that does not belong to a pool and that is not in a readable/writable state from the host 101 (an LDEV for which an IO path is not defined). Accordingly, by referring to the management information acquired from the storage system 104, the pool capacity expansion automation program 903 may determine whether there is an unused LDEV having a capacity corresponding to the real capacity increment or the logical capacity increment.

First, a method of determining whether or not there is an unused LDEV having a capacity corresponding to the real capacity increment will be described. The pool capacity expansion automation program 903 may refer to the management information acquired from the storage system 104 in Step 901-3 or 901-6, and thereby extract unused LDEV candidates and perform a determination based on the extraction.

When adding an LDEV belonging to a RAID group composed of drives 114 (that is, a storage device not having a compression function) to the pool, regardless of which LDEV is added to the pool, the real capacity of the pool increases by an amount corresponding to the logical capacity of the LDEV. Accordingly, if the sum of the logical capacities of all the unused LDEVs belonging to the RAID group composed of drives 114 is equal to or larger than the real capacity increment, it can be said that there is an unused LDEV having a capacity corresponding to the real capacity increment.

In contrast, when selecting an unused LDEV from the compressed RG, it must be selected from a compressed RG which satisfies the following two conditions.
a) The sum of the logical capacities of the pool VOL of the compressed RG and the logical capacity of the unused LDEV selected this time is less than the real capacity of the compressed RG.
b) The pool VOL of the compressed RG does not belong to a pool other than the pool to be processed this time.

If a compressed RG that does not satisfy the above condition a) is selected, that is, even if an unused LDEV is selected from a compressed RG whose total of the logical capacity of the pool VOL of the compressed RG exceeds the real capacity of the compressed RG and is added to the pool, the real capacity of the pool does not increase (this is apparent from the definition of the real capacity of the pool as mentioned above). There is also a constraint that an unused LDEV of a compressed RG that does not correspond to the above condition b) cannot be added to the pool to be processed at this time. Accordingly, the storage system 104 according to the present embodiment selects an unused LDEV from a compressed RG that satisfies the above conditions a) and b).

In addition, when an unused LDEV selected from a compressed RG satisfying these conditions is added to the pool, the real capacity of the pool increases by the logical capacity of the added unused LDEV. Accordingly, if the sum of the logical capacities of the unused LDEVs selected from a compressed RG that satisfies the conditions a) and b) above is equal to or larger than the real capacity increment, it can be said that there is an unused LDEV having a capacity corresponding to the real capacity increment.

Based on the above idea, the pool capacity expansion automation program 903 makes a determination at Step 903-1. That is, in the case of a state in which the threshold value of the real capacity is exceeded, the pool capacity expansion automation program 903 may calculate the sum of the logical capacities of the unused LDEVs belonging to RAIDs group consisting of drives 114 and the sum of the logical capacities of the unused LDEVs selected from the compressed RGs. If this is equal to or greater than the real capacity increment ($\Delta C$) (903-1: Y), the pool capacity expansion automation program 903 may executes Step 903-7. If the determination in Step 903-1 is negative, the pool capacity expansion automation program 903 may executes Step 903-2.

The method of determining whether or not there is an unused LDEV corresponding to a logical capacity increment is easier than determining whether or not there is an unused LDEV corresponding to a real capacity increment. In this case, the pool capacity expansion automation program 903 may determine whether the sum of the logical capacities of arbitrary unused LDEVs is equal to or larger than the logical capacity increment.

When there is no unused LDEV corresponding to the real capacity increment or the logical capacity increment (Step 903-1: N), the pool capacity expansion automation program 903 may determine whether a new LDEV can be defined in the storage system 104 (Step 903-2). As described above, one or more LDEVs can be defined in a RAID group. There may also be areas in a RAID group that are not defined as LDEVs. In step 903-2, it may be determined whether such an area exists and whether the total size of the area is equal to or greater than the real capacity increment or the logical capacity increment.

When an LDEV can be newly defined (Step 903-2: Y), the pool capacity expansion automation program 903 may notify a user that a new LDEV can be created to expand the pool capacity, and verify with the user whether creation of the new LDEV is permitted (Step 903-3). In particular, the pool capacity expansion automation program 903 may display a GUI screen that allows for selection of whether or not to allow for creation of a new LDEV.

When the user permits creation of a new LDEV (Step 903-4: Y), the pool capacity expansion automation program 903 may issue an instruction to the storage system 104 to create a new LDEV (Step 903-5). Upon receiving this instruction, the storage system 104 may create a new LDEV. Steps 903-3 and 903-4 may be omitted. That is, the pool capacity expansion automation program 903 may automatically issue an instruction to create a new LDEV (Step 903-5) without obtaining permission from the user.

If the determination at Step 903-2 is negative, or if at Step 903-4 the user does not permit creation of a new LDEV, then the pool capacity expansion automation program 903 may output, to the display of the management server 102, a message stating that it is necessary to add the storage device to the storage system 104 (Step 903-6), and end the processing.

After the processing of Step 903-5, or when the determination of Step 903-1 is affirmative, Step 903-7 may be executed. In Step 903-7, the pool capacity expansion automation program 903 may select the LDEV to be added to the pool from the unused LDEVs. The selection criteria for when the pool capacity expansion automation program 903 selects an unused LDEV in Step 903-7 will be described later.

The pool capacity expansion automation program 903 may select the LDEV to be added to the pool, and then display a list of the selected LDEVs on the screen of the management server 102 (Step 903-8). In Step 903-8, the pool capacity expansion automation program 903 may verify with the user whether the selected LDEV may be added to the pool.

When the user permits addition of the LDEV selected by the pool capacity expansion automation program 903 to the pool (Step 903-9: Y), the pool capacity expansion automation program 903 transmits the information of the selected LDEV and the identification number information of the pool to which the LDEV is added to the storage system 104, and the storage system 104 may add the selected LDEV to the pool (Step 903-10). As the LDEV is added to the pool, the capacity of the pool fluctuates, such that the storage system 104 adds the LDEV to the pool, and the pool management table 600, the LP conversion table 702, and the compressed RG capacity information management table 703 are updated. Details of the processing performed by the storage system 104 when Step 903-10 is executed will be described later. After Step 903-10, the pool capacity expansion automation program 903 terminates. When the user does not permit addition of the selected LDEV to the pool (Step 903-9: N), the pool capacity expansion automation program 903 ends without executing Step 903-10. Steps 903-8 and 903-9 may be omitted. That is, the pool capacity expansion automation program 903 may execute step 903-10 without obtaining permission from the user.

Figure 18:
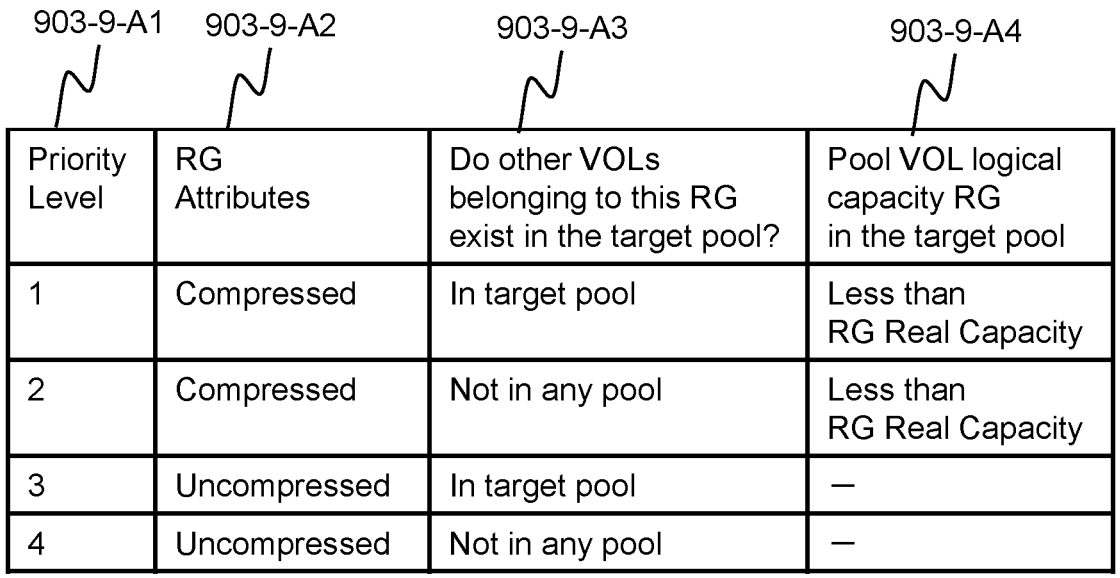
FIG. 18 is an explanatory diagram of selection criteria when the pool capacity expansion automation program selects an unused LDEV when the pool real usage amount threshold value is exceeded.
Figure 19:
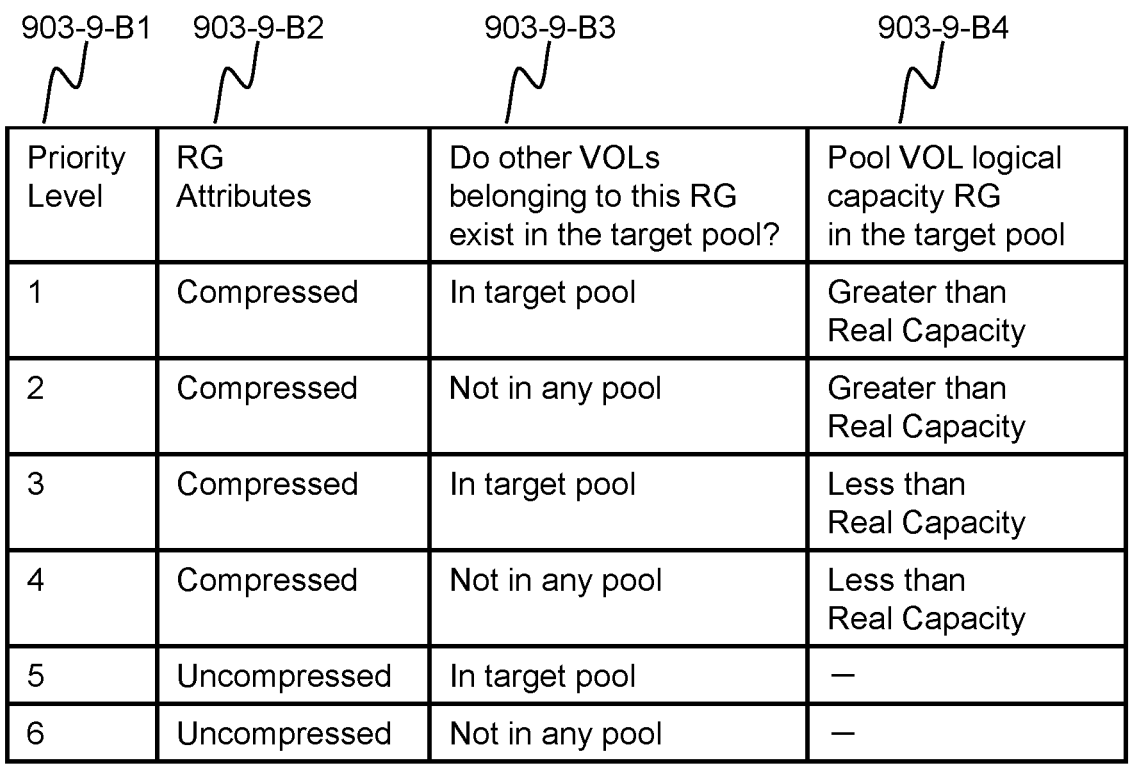
FIG. 19 is an explanatory diagram of selection criteria when the pool capacity expansion automation program selects the unused LDEV when the pool logical usage amount threshold value is exceeded.

Selection criteria when the pool capacity expansion automation program 903 selects an unused LDEV in Step 903-7 will be described with reference to FIGS. 18 and 19. FIG. 18 illustrates an example of a table in which the rules (conditions) for selecting LDEV candidates (hereinafter referred to as "candidate LDEVs") to be selected when expanding the real capacity of the pool (when the pool capacity expansion automation program 903 is called from Step 901-4) are arranged in descending order of priority. In contrast, FIG. 19 illustrates a table in which the rules (conditions) for selecting candidate LDEVs are arranged in descending order of priority when expanding the logical capacity of the pool (when the pool capacity expansion automation program 903 is called from Step 901-7). Each column (903-9-A 2, 903-9-B 2, 903-9-A 3, 903-9-B 3, 903-9-A 4, 903-9-B 4) represents a rule (selection criteria).

Each rule used by the pool capacity expansion automation program 903 will be described. The pool capacity expansion automation program 903 uses the following selection criteria.
(a) The attributes of the RAID group to which the candidate LDEV belongs (column 903-9-A 2, 903-9-B 2).
(b) The pool to which each LDEV included in the RAID group to which the candidate LDEV belongs (column 903-9-A3, 903-9-B3).
(c) The total capacity of the LDEVs as the pool VOLs among the LDEVs in the RAID group to which the candidate LDEV belongs (column 903-9-A4, 903-9-B4).

With respect to the criterion (a), the pool capacity expansion automation program 903 selects the LDEV depending on whether or not the RAID group to which the candidate LDEV belongs belongs to the RAID group composed of compression drives 113. As shown in FIG. 18 (column 903-9-A 2) and FIG. 19 (column 903-9-B 2), the pool capacity expansion automation program 903 preferentially selects LDEVs belonging to the compressed RG.

With respect to the criterion (b), the pool capacity expansion automation program 903 selects the LDEVs matching one of the following conditions (conditions b-1, b-2) as a candidate LDEV.

(b-1) An LDEV (pool VOL) already belonging to a capacity expansion target pool and an LDEV included in the same RAID group.
(b-2) An LDEV included in a RAID group not belonging to any pool.

An LDEV that does not correspond to any of the conditions b-1 and b-2, for example, an LDEV in a RAID group including an LDEV already belonging to another pool, is not selected as a candidate LDEV. As shown in FIG. 18 (column 903-9-A 3) and FIG. 19 (column 903-9-B 3), the pool capacity expansion automation program 903 selects LDEVs corresponding to the condition b-1 as candidate LDEVs with priority over the LDEVs corresponding to the condition b-2.

With respect to the criterion (c), the candidate LDEVs selected by the pool capacity expansion automation program 903 are different between cases where the real capacity is expanded and cases where the logical capacity is expanded. When expanding the real capacity, the pool capacity expansion automation program 903 selects the candidate LDEVs from among the compressed RGs whose total capacity (logical capacity) of the LDEVs used as the pool VOL is less than the real capacity of the RAID group among the RAID groups (compressed RG). This is because if the candidate LDEVs are not selected from among the compressed RGs matching this condition, the real capacity of the pool will not be increased.

In contrast, when expanding the logical capacity, the pool capacity expansion automation program 903 preferentially selects the candidate LDEVs from RAID groups having a total capacity (logical capacity) of the LDEVs used as the pool VOL that is equal to or larger than the real capacity of the RAID group. In cases where it is necessary to expand the logical capacity (FIG. 16: Step 901-7), the real capacity has already been expanded (Step 901-4), such that it is not necessary to expand the real capacity.

The pool capacity expansion automation program 903 may select an unused LDEV according to the above selection criteria. Also, since a capacity equal to or larger than the real capacity increment (or logical capacity increment) must be added to the pool, a plurality of unused LDEVs may be selected.

Figure 20:
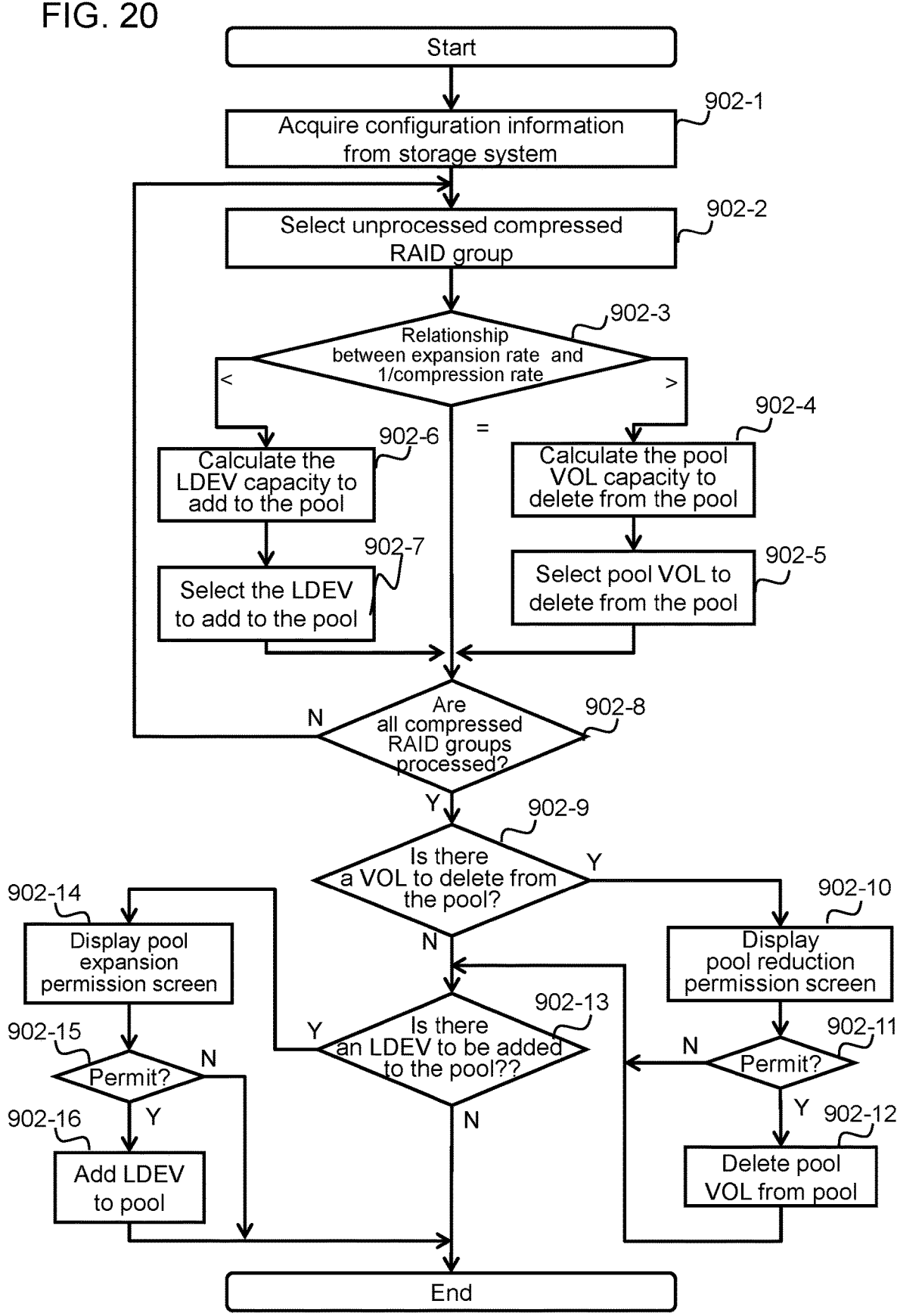
FIG. 20 is a flowchart of the pool VOL configuration optimization program.

Next, the flow of processing executed in Step 901-8, that is, the processing performed by the pool VOL configuration optimization program 902 will be described with reference to FIG. 20. When called from the pool capacity management program 901, the pool VOL configuration optimization program 902 designates a pool ID (providing it as a parameter) of a pool for which configuration optimization is to be performed. The pool VOL configuration optimization program 902 performs configuration optimization for the designated pool (hereinafter referred to as a "target pool").

First, the pool VOL configuration optimizing program 902 acquires the configuration information from the storage system 104 (Step 902-1). The configuration information acquired here is information on the capacity (logical capacity) of the LDEV of the storage system 104 and the capacity (logical capacity, real capacity, logical usage amount, real usage amount) of the RAID group belonging to the target pool.

Subsequently, the pool VOL configuration optimization program 902 selects one compressed RG from among the compressed RGs belonging to the target pool that has not yet undergone the processing from Step 902-3 onward (Step 902-2). Hereinafter, in the process of the description of FIG. 20, the compressed RG selected here will be referred to as a "target RG".

In Step 902-3, the pool VOL configuration optimization program 902 calculates the reciprocal of the expansion rate and the compression rate of the compressed RG selected in step 902-2. The expansion rate calculated here is given by the "total logical capacity of pool VOL belonging to the RAID group÷real capacity of the RAID group". The reciprocal of the compression rate is given by "real usage amount of the RAID group÷logical usage amount of the RAID group". In the following description, the reciprocal of the compression rate may be referred to as "1/compression rate" in some cases.

When the expansion rate and 1/compression rate are equal and the compression rate does not fluctuate in the future, the physical address space of the storage device and the logical address space are consumed at the same rate. For example, when the physical address space of the storage device is completely consumed (when data is written in the whole area of the physical address space), the logical address space is also 100% consumed. Accordingly, it can be said that the relationship between the logical capacity and the real capacity is in an ideal state, and in this case it is unnecessary to adjust the logical capacity or real capacity of the target RG. Therefore, when the expansion rate is equal to 1/compression rate (Step 902-3: =), the pool VOL configuration optimization program 902 proceeds to Step 902-8.

When the expansion rate is larger than 1/compression rate, this indicates that the logical capacity of the RAID group is excessive; that is, the amount of the physical area is in a state of insufficiency compared with the ideal state. When an area of a RAID group in such a state is used as a pool VOL, although there are unused pages, since there is no unused physical area, a state occurs in which data cannot be written to the pool VOL (the storage area in the RAID group). In this case, it is desirable to reduce the difference between the expansion rate and the 1/compression rate by reducing the pool VOLs (by deleting the pool VOLs from the pool, the expansion rate of the RAID group to which the deleted pool VOL belongs becomes smaller).

Therefore, when the expansion rate is larger than 1/compression rate (Step 902-3:>), the pool VOL configuration optimization program 902 reduces the logical capacity of the RAID group by deleting the pool VOLs belonging to the target RG from the target pool. The pool VOL configuration optimization program 902 calculates the logical capacity of the pool VOLs to be reduced from the target pool (Step 902-4). The logical capacity calculated here is called a reduction capacity. In the present embodiment, the difference between the total logical capacity of the pool VOLs belonging to the target RG and the real capacity/compression rate of the target RG is taken as the reduction capacity. As an example, an example will be described in which the reduction capacity is obtained for RAID group with an expansion rate of 300%, a compression rate of 50%, and a real capacity of 10 TB. In this case, since the total logical capacity of the pool VOLs in this RAID group is 30 TB and the real capacity/compression rate of the RAID group is 20 TB, the reduction capacity is 30 TB–20 TB=10 TB.

Subsequently, in Step 902-5, the pool VOL configuration optimization program 902 selects the pool VOL to be deleted from the target RG. Here, the pool VOL configuration optimization program 902 selects the pool VOLs so that the total of the logical capacities of the selected pool VOLs is equal to or larger than the reduction capacity calculated in Step 902-4. When the pool VOL configuration optimization program 902 selects the pool VOLs to be deleted, the pool VOL configuration optimization program 902 preferentially selects from the pool VOLs having a small logical usage amount. This is because when deleting the pool VOLs from the pool, it is necessary to transfer (evacuate) the data stored in the deletion target pool VOL to another pool VOL.

For example, in the case where the logical capacity of the LDEV 1 is 11 TB, the logical usage amount is 5 TB, the logical capacity of the LDEV 2 is 6 TB, the logical usage amount is 2 TB, the logical capacity of the LDEV 3 is 5 TB, and the logical usage amount is 1 TB, the reduction capacity exceeds 10 TB in either the case that only LDEV 1 is selected or the case that LDEV 2 and LDEV 3 are selected. However, since the total of the logical usage amount is smaller when LDEV 2 and LDEV 3 are selected (LDEV 1 is 5 TB, LDEV 2 and LDEV 3 are 3 TB in total), the amount of data to be evacuated is reduced, and the execution time of the subsequent Step 902-12 can be shortened.

In contrast, when the expansion rate is smaller than 1/compression rate, this indicates that the real capacity of the RAID group is excessive in comparison with the ideal state. In this case, even when the pages are used up, unused physical area may remain in the physical address space of the storage device. Therefore, at this time, the pool VOL configuration optimization program 902 may attempt to increase the expansion rate by adding the unused LDEVs of the target RG to the pool, and to make the difference between the expansion rate and 1/compression rate smaller than it is currently.

Accordingly, when the expansion rate is smaller than 1/compression rate (Step 902-3: <), the pool VOL configuration optimization program 902 calculates the logical capacity to be added to the target pool (Step 902-6). The logical capacity to be added is obtained from the difference between the real capacity/compression rate of the target RG and the total logical capacity of the pool VOL belonging to the target RG. For example, a RAID group with an extension rate of 200%, a compression rate of 25%, and a real capacity of 10 TB will be described as an example. In this case, since the total logical capacity of the pool VOL in the RAID group is 20 TB and the real capacity/compression rate is 40 TB, the logical capacity to be added is 40 TB–20 TB=20 TB.

Subsequently, in Step 902-7, the pool VOL configuration optimization program 902 selects the LDEVs to be added to the target pool from the target RG. Here, the pool VOL configuration optimization program 902 selects the LDEVs so that the total of the logical capacities of the selected LDEVs is equal to or larger than the logical capacity to be added, as calculated in Step 902-6.

After completion of Step 902-5 or Step 902-7, the pool VOL configuration optimization program 902 determines whether or not the processing of Step 902-2 to Step 902-7 has been performed for all the compressed RGs belonging to the target pool. If compressed RGs for which the processes in Steps 902-2 to 902-7 have not yet been performed still remain (Step 902-8: N), the pool VOL configuration optimization program 902 again performs the processing from Step 902-2. When processing is performed for all the compressed RGs (Step 902-8: Y), the processing from Step 902-9 onward is performed.

When the pool VOL to be deleted from the pool is selected as a result of the processing up to Step 902-8 (Y in Step 902-9), the pool VOL configuration optimization program 902 displays, on the display of the management server 102, a confirmation screen for verifying with the user whether or not the LDEV (pool VOL) selected in Step 902-5 can be deleted from the pool (Step 902-10). A display example here is illustrated in FIG. 21. The pool VOL configuration optimization program 902 may display the ID (identification number) and capacity of the selected deletion candidate LDEV on the confirmation screen (B 902-12). Further, as illustrated in FIG. 21 (B 902-12), the RAID level of the deletion candidate LDEVs and the type of the storage device being used may be displayed on the confirmation screen. Further, the pool VOL configuration optimization program 902 may calculate the predicted value of the capacity when the LDEV is deleted from the pool, and display it on the confirmation screen such that the user can assess the validity of deleting the selected LDEV (B 902-11).

Upon confirming that the user has pressed the "Apply" button (B 902-13) on the confirmation screen (Step 902-11: Y), the pool VOL configuration optimization program 902 instructs the storage system 104 to delete the deletion candidate LDEV from the target pool (Step 902-12). When the user presses the "Cancel" button (B 902-14), (Step 902-11: N), Step 902-12 is skipped. Step 902-10 and Step 902-11 may be omitted. In other words, the pool VOL configuration optimization program 902 may execute step 902-12 without obtaining permission from the user.

When the LDEV to be added to the pool is selected as a result of the processing up to Step 902-8 (Step 902-13: Y), the pool VOL configuration optimization program 902 displays the confirmation screen on the display of the management server 102 for verifying with the user whether or not the selected LDEV can be added to the pool (Step 902-14). A display example here is illustrated in FIG. 22. The pool VOL configuration optimization program 902 displays the ID (identification number) and capacity of the selected addition candidate LDEV on the confirmation screen (B 902-14). As in FIG. 21, the RAID level of the deletion candidate LDEV and the type of the storage device being used may be displayed on the confirmation screen.

Upon confirming that the user pressed the "Apply" button on the confirmation screen (Step 902-15: Y), the pool VOL configuration optimization program 902 instructs the storage system 104 to add the addition candidate LDEV to the target pool (Step 902-16). After the completion of step 902-16, the processing of the pool VOL configuration optimization program 902 ends. In contrast, if the user presses the "Cancel" button (Step 902-15: N), the process of the pool VOL configuration optimization program 902 ends. Also, Step 902-11 and Step 902-12 may be omitted. The pool VOL configuration optimization program 902 may execute Step 902-16 without obtaining permission from the user.

In the above description, an example has been described in which the process of the pool VOL configuration optimization program 902 is terminated when the expansion rate is equal to 1/compression rate in Step 902-3. However, as there are few cases where the expansion rate is completely equal to 1/compression rate, the pool VOL configuration optimization program 902 may end the processing in the case that 1/compression rate satisfies the following expression (4):

[Expression 4]

$$(\text{Expansion rate}-\alpha) \leq 1/\text{Compression rate} \leq (\text{Expansion rate}+\alpha) \quad (4)$$

(where α is a fixed value and sufficiently smaller than the expansion rate).

Also, in Step 902-4, although it was described that the difference between the total logical capacity of the pool VOL belonging to the RAID group and the real capacity/compression rate of the RAID group may be set as the reduction capacity, the value calculated by the following equation (5) may be used as the reduction capacity.

[Expression 5]

$$\text{Total logical capacity of the pool VOL in the RAID group} - \text{Real capacity of the RAID group}/(\text{compression rate}+\beta) \quad (5)$$

(Where ß is a predetermined constant).

That is, by calculating the reduction capacity with a compression rate that is larger than the current compression rate by ß and making it smaller than the theoretical value calculated from the current compression rate, even if the compression rate fluctuates and more physical area is consumed, is it possible to prevent the logical free capacity (the difference between the logical capacity and the logical usage amount) of the RAID group or the pool from becoming insufficient.

Also, in Step 902-9, although it was explained that the difference between the real capacity/compression rate of the RAID group and the logical capacity of the RAID group may be set as the logical capacity to be added, it may also be calculated using the following expression (6).

[Expression 6]

$$\text{Real capacity of the RAID group}/(\text{compression rate}-\gamma) - \text{total logical capacity of the pool VOL in the RAID group} \quad (6)$$

(Where γ is a predetermined constant)

That is, by calculating the logical capacity to be added with a compression rate which is smaller than the current compression rate by γ and making it larger than the theoretical value calculated from the current compression rate, even in cases when the real free capacity increases due to greater compression, it is possible to prevent the logical free capacity of the RAID group or pool from becoming insufficient.

Figure 23:
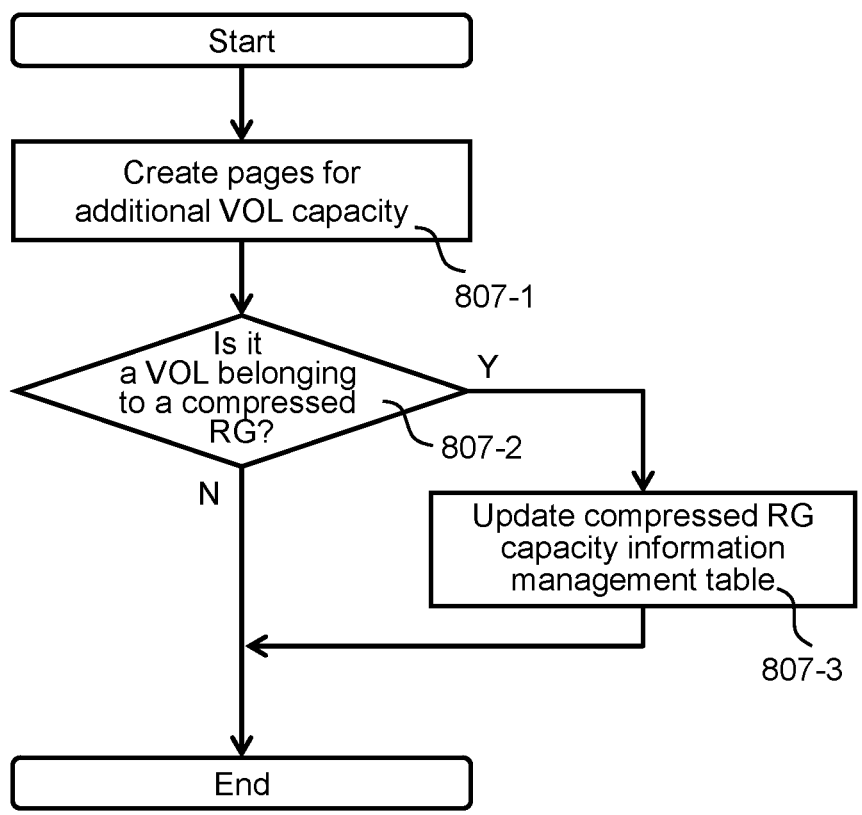
FIG. 23 is a flowchart of the pool capacity expansion program.

Next, the flow of processing performed in the storage system 104 when the management server 102 executes Step 902-13 or Step 903-10 will be described with reference to FIG. 23. When the management server 102 executes Steps 902-13 or 903-10, the pool capacity expansion program 807 is activated in the storage system 104, and the pool capacity expansion program 807 adds LDEVs to the pool. At this time, the management server 102 provides notification of the identification number of the expansion target pool and the identification number of the LDEVs to be added.

When the pool capacity expansion program 807 is initiated, the pool capacity expansion program 807 first adds a record to the LP conversion table 702 (Step 807-1). If the size of the LDEV (LDEV to be added) notified by the management server 102 has a size of n pages, the pool capacity expansion program 807 adds entries for n records to the LP conversion table 702. Also, information is registered in the pool volume number (702-1), page # (702-2), RG number (702-3), drive number (702-4) and start address (702-5) of each record.

If the LDEV to be added to the pool is an LDEV belonging to a compressed RG (Step 807-2: Y), the pool capacity expansion program 807 updates the contents of the compressed RG capacity information management table 703 (and adds the logical capacity of the LDEVs to be added to the pool VOL capacity sum 703-2. Also, if necessary, the pool internal real capacity 703-3 is also added), and the processing is terminated. When the LDEV to be added to the pool is not an LDEV belonging to the compressed RG (Step 807-2: N), the pool capacity expansion program 807 ends without executing step 807-3.

Figure 24:
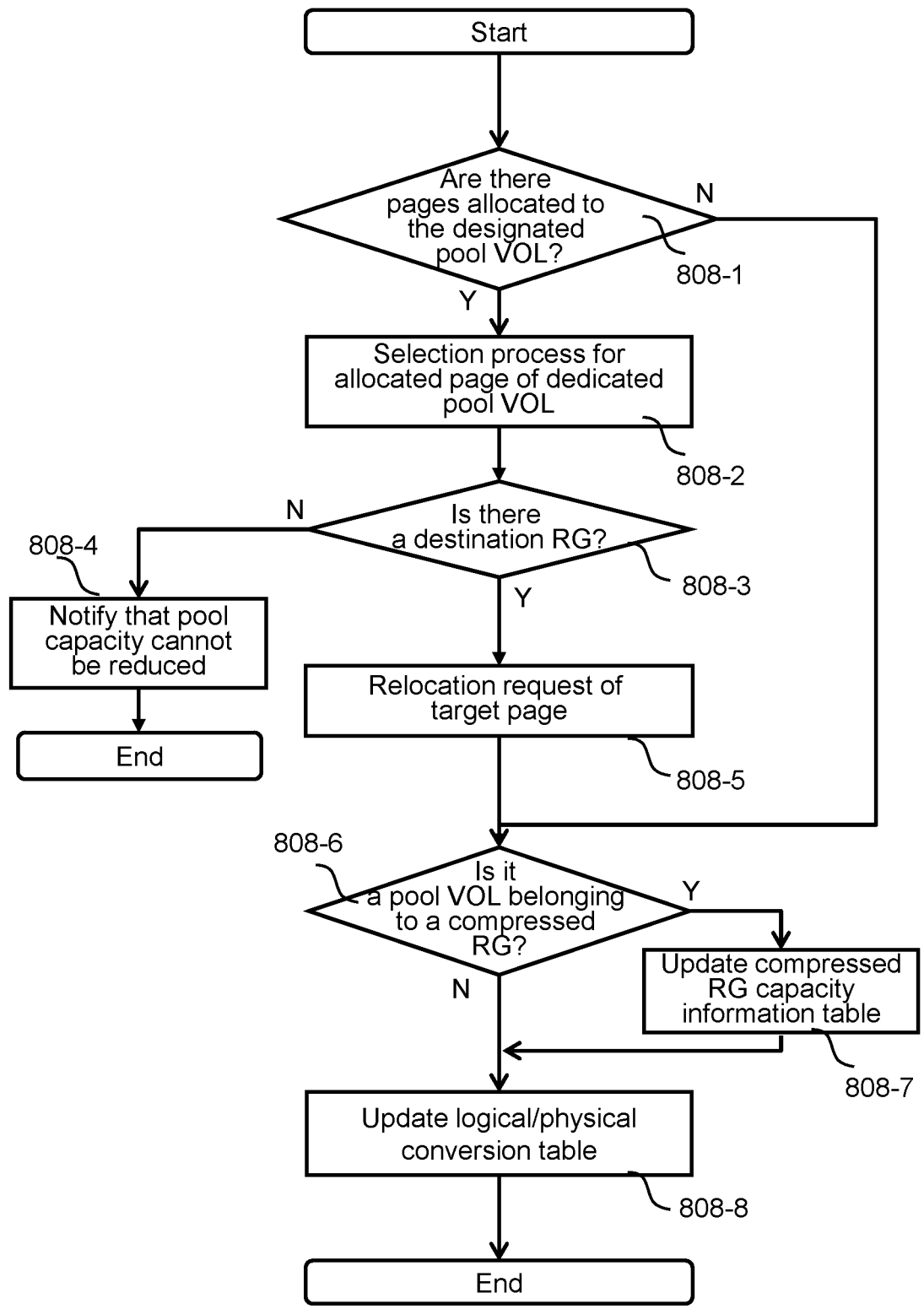
FIG. 24 is a flowchart of the pool capacity reduction program.

Next, the flow of processing performed in the storage system 104 when the management server 102 executes Step 902-8 will be described with reference to FIG. 24. When the management server 102 executes Step 902-8, the pool capacity reduction program 808 is activated in the storage system 104, and the LDEV is deleted from the pool by the pool capacity reduction program 808. At this time, the management server 102 provides notification of the identification number of the LDEV deletion target pool and the identification number of the LDEV to be deleted.

First, the pool capacity reduction program 808 may determine whether the page of the LDEV to be deleted that was notified by the management server 102 is in use (Step 808-1). If any page in the deletion target LDEV is allocated to the virtual page of the virtual volume, it is determined that the page of the deletion target LDEV is in use. In this case, the pool capacity reduction program 808 identifies all the pages allocated to the virtual page of the virtual volume among the pages in the deletion target LDEV (Step 808-2). If none of the pages of the deletion target LDEV are unused (Step 808-1: N), then Step 808-6 is performed.

When a page in the deletion target LDEV is assigned to a virtual page, it is necessary to transfer the data in the page allocated to the virtual page to another pool VOL before deleting the deletion target LDEV from the pool. The "another pool VOL" here is selected from the LDEVs belonging to RAID groups other than the RAID group to which the deletion target LDEV belongs. Accordingly, in Step 808-3, the pool capacity reduction program 808 searches for a pool VOL (one or more) belonging to a RAID group other than the RAID group to which the deletion target LDEV belongs. Further, in order to determine whether the data of the LDEV to be deleted can be transferred to the pool VOL found here, the pool capacity reduction program 808 may determine whether or not the total size of the unused pages in the found pool VOL is greater than the total size of in-use pages of the deletion target LDEV.

If the determination in Step 808-3 is negative, the pool capacity reduction program 808 notifies the management server 102 that the LDEV (pool VOL) cannot be deleted from the pool and terminates the processing. Upon receiving this notification, the management server 102 displays on the display an indication that the reduction of the pool capacity has failed.

If the determination in Step 808-3 is affirmative, the pool capacity reduction program 808 transfers the data in the in-use pages of the deletion target LDEV to the unused page in the found pool VOL (Step 808-5). As the processing of Step 808-5 is the same as the processing of Step 805-4 (that is, the processing of FIG. 15), the description here is omitted.

After Step 808-5, the pool capacity reduction program 808 determines in Step 808-6 whether the deletion target LDEV is an LDEV belonging to the compressed RG. When the deletion target LDEV is an LDEV belonging to the compressed RG (Step 808-6: Y), the pool capacity reduction program 808 updates the compressed RG capacity information management table 703 (Step 808-7). Here, the logical capacity of the deletion target LDEV is subtracted from the pool VOL capacity sum 703-2. Also, if necessary, the pool internal real capacity 703-3 is also subtracted.

Finally, the pool capacity reduction program 808 may delete the information of all pages included in the deletion target LDEV from the LP conversion table 702 (Step 808-8), and end the processing.

The above is the description of the storage system according to the embodiments. The computer system according to the present embodiment also monitors the real usage amount in addition to the logical usage amount of the pool. When the real usage amount exceeds a predetermined threshold value, the real capacity of the pool may be increased. Further, if the logical usage amount exceeds a predetermined threshold, the logical capacity of the pool may be increased. As a result, although many unused pages remain in the pool, it is possible to prevent situations where data cannot be written from the host to the storage system because the storage area of the storage device is insufficient. Conversely, although many physical areas of the storage device remain, it is also possible to prevent situations in which data cannot be written from the host to the storage system because there are insufficient unused pages in the pool.

Furthermore, the computer system according to the present embodiment adjusts the capacity of the pool so that the expansion rate of the RAID group (the ratio of the total logical capacity to the real capacity in the pool VOL) does not deviate from the reciprocal of the compression rate (logical usage amount÷real usage amount). When the expansion rate and 1/compression rate are equal, as the logical capacity and the real capacity of the pool are consumed at the same rate, it is possible to prevent situations where only one of the unused pages or the physical area in the pool are excessively insufficient.

Although the embodiments of the present invention have been described above, these are examples for explaining the present invention, and the scope of the present invention is not limited to these embodiments. That is, the present invention can be implemented in a variety of other forms.

For example, in the above-described embodiments, the pool capacity expansion automation program 903 and the pool VOL configuration optimization program 902 are executed in the management server 102. However, as another embodiment, the configuration of the computer system may be such that most of the processing performed by the pool capacity expansion automation program 903 and the pool VOL configuration optimization program 902 is performed by the storage system 104. For example, among the processes of the pool capacity expansion automation program 903 and the pool VOL configuration optimization program 902 described above, only the program code for receiving screen display and information input from the user is executed in the management server 102, and the other program code may be executed by the processor 119 of the storage system 104.

As another embodiment, configurations are also possible in which the host write processing program 802, the compressed RG monitoring program 803, the destage processing program 804, the exhaustion avoidance relocation processing program 805, the page relocation processing program 806, the pool capacity expansion program 807, and the pool capacity reduction program 808 (hereinafter abbreviated as "programs 802 to 808") are executed not by the storage system 104 but by a general-purpose computer such as a server or a personal computer (hereinafter simply referred to as "computer"). In this case, the computer may include the compression drives 113 and the drives 114, and the computer may execute the respective programs described in the above embodiments such that the write data received from the external host 101 or the like is stored in the compression drives 113 or the drives 114.

In addition, the pool capacity management program 901, the pool VOL configuration optimization program 902, and the pool capacity expansion automation program 903 (abbreviated as "programs 901 to 903" below) may also be executed by a computer. It should be noted that the programs 802 to 808 and the programs 901 to 903 may be configured to be executed by the same computer or may be configured to be executed by different computers. In the case where the programs 802 to 808 and the programs 901 to 903 are executed by the same computer, it is preferable to form at least a virtual machine for executing the programs 802 to 808 and a virtual machine for executing the programs 901 to 903 on the computer by executing a hypervisor program to form the virtual machines on the computer. Further, the computer executing the programs 802 to 808 and the programs 901 to 903 may also generate a virtual machine for executing the programs using a virtual volume, such as the host 101 described in the above embodiment, and the computer system described in the above embodiment may be realized on a single computer.

Further, in the above-described embodiment, when a logical device (LDEV) is added to or deleted from the pool, the process of verifying with a user is performed. However, as another embodiment, the pool capacity expansion automation program 903 and the pool VOL configuration optimization program 902 may add or delete logical devices (LDEV) to or from the pool without verifying with the user.

In addition, in the storage system 104 described above, RAID groups may be created from the storage devices, but generation of RAID parity is not an essential requirement of the present invention. For example, what is referred to as a RAID-0 (a disk array that does not generate redundant data such as parity) may be used. In addition, it is not necessary to form RAIDs group from a plurality of storage devices. Each of the partial areas formed by dividing the storage area provided by a single storage device may be defined as a logical device, and the defined logical devices may be used as the pool VOL.

Further, the computer system according to the embodiment described above compares the expansion rate of the compressed RG and the compression rate, and adds or deletes pool VOLs so that the difference between the expansion rate and 1/compression rate decreases. However, as another embodiment, the computer system may calculate the expansion rate and the compression rate for each storage device constituting the compressed RG, and may add or delete pool VOLs based on the expansion rate and the compression rate of each storage device. In that case, the computer system may identify the storage device having the largest difference between the expansion rate and 1/compression rate (that is, "expansion rate−1/compression rate") among the storage devices constituting the compression RG, and may determine the number of pool VOLs to be added or deleted based on the difference between the expansion rate and 1/compression rate. This is because, when adjusting the capacity of the pool, it is of the greatest importance to eliminate states in which the amount of physical area is insufficient.

REFERENCE SIGNS LIST

100: computer system, 101: host, 102: management server, 103: network, 104: storage system, 105: external storage, 106: port, 107: maintenance I/F, 108: port, 109: microprocessor package board (MPB), 110: cache memory, 111: shared memory, 112: bus, 113: compression drive, 114: drive, 115: RAID group, 118: local memory, 119: processor, 210: controller, 211: drive I/F, 212: internal network, 213: processor, 214: memory, 215: flash I/F, 216: compression/decompression circuit

The invention claimed is:
1. A computer system comprising:
a storage system for providing a virtual volume to a host, the storage system including:
a plurality of storage devices, each storage device having a predetermined amount of physical area, and
a processor; and
a management server for managing the storage system,
wherein the processor is configured to:
define, using logical storage areas provided by the plurality of storage devices, a RAID group having one or more logical devices,
manage, by assigning it to a pool, a logical device having a logical storage area allocatable to the virtual volume,
allocate, in response to receiving a data write request from the host for a virtual page in the virtual volume, an unused logical storage area in the pool to the virtual page and perform a data write to the storage device having the allocated logical storage area,
wherein the storage device is configured to:
generate, in response to receiving a write request for the data from the processor with respect to the logical storage area, compressed data by compressing the data,
store the compressed data in the physical area, and
manage, in association with the logical storage area, the physical area in which the compressed data is stored; and
wherein the processor is further configured to:
increase, among the physical areas assigned to the pool, the amount of the physical area assigned to the pool when a physical usage amount that indicates the amount of the physical area associated with the logical storage area allocated to the virtual volume exceeds a predetermined threshold value, and
increase, among the logical storage areas assigned to the pool, the amount of the logical storage area assigned to the pool and associate the logical storage area with a physical area that belongs to the pool when a logical usage amount that indicates the amount of the logical storage area allocated to the virtual volume exceeds a predetermined threshold value.
2. The computer system of claim 1, wherein:
the processor is further configured to send a notification to the management server that the physical usage amount or the logical usage amount exceeds the predetermined threshold value; and
the management server is configured to determine, in response to receiving the notification, a logical device to be added to the pool.
3. The computer system of claim 2, wherein:
the computer system is further configured to add to the pool, when increasing the amount of the physical area, from among the RAID groups having logical devices assigned to the pool, logical devices included in a RAID group whose total of the logical devices already assigned to the pool is less than a real capacity of the RAID group; and
the real capacity of the RAID group is a total of the physical areas of the storage devices belonging to the RAID group.
4. The computer system of claim 2, wherein:
when increasing the amount of the logical storage area, the computer system is further configured to preferentially add to the pool, from among the RAID groups having logical devices assigned to the pool, logical devices included in a RAID group whose total of the logical devices already assigned to the pool is greater than or equal to a real capacity of the RAID group; and the real capacity of the RAID group is a total of the physical areas of the storage devices belonging to the RAID group.

5. The computer system of claim 1, wherein the processor is configured to calculate the physical usage amount by acquiring, from the storage device, an amount of the physical area associated with the logical storage area.

6. The computer system of claim 1, wherein the processor is configured to move, when the physical usage amount of the RAID group assigned to the pool exceeds a predetermined threshold value, the data stored in the RAID group to another RAID group assigned to the pool.

7. The computer system of claim 1, wherein:
the computer system is further configured to adjust, based on an expansion rate and a compression rate of the RAID group having the logical device assigned to the pool, the number of the logical devices belonging to the pool;
the expansion rate is a quotient of the sum of the logical storage areas of the RAID group and the sum of the physical areas of the storage devices assigned to the RAID group; and
the compression rate is a value obtained by dividing a total amount of data written in the RAID group after data compression by the sum of the data written in the RAID group by the processor.

8. The computer system of claim 7, wherein:
the computer system is further configured to determine, when the expansion rate is greater than a reciprocal of the compression rate, logical devices to be removed from the pool such that the difference between the expansion rate and the reciprocal of the compression rate is reduced.

9. The computer system of claim 8, wherein:
the computer system is further configured to move, when the logical storage area of the logical device to be removed is allocated to the virtual volume, data of the logical storage area allocated to the virtual volume to another logical device.

10. A management server for managing a storage system for providing a virtual volume to a host, the storage system including:
a plurality of storage devices, each storage device having a predetermined amount of physical area, and
a processor; and
wherein the storage system is configured to:
define, using logical storage areas provided by the plurality of storage devices, a RAID group having one or more logical devices,
manage, by assigning it to a pool, a logical device having a logical storage area allocatable to the virtual volume,
allocate, in response to receiving a data write request from the host for a virtual page in the virtual volume, an unused logical storage area in the pool to the virtual page and perform a data write to the storage device having the allocated logical storage area, wherein the storage device is configured to:
generate, in response to receiving a write request for the data from the processor with respect to the logical storage area, compressed data by compressing the data,
store the compressed data in the physical area, and
manage, in association with the logical storage area, the physical area in which the compressed data is stored; and
wherein the management server is configured to:
determine, among the physical areas assigned to the pool, logical devices to be added to the pool when a physical usage amount that indicates the amount of the physical area associated with the logical storage area allocated to the virtual volume exceeds a predetermined threshold value, or
determine, among the logical storage areas assigned to the pool, logical devices to be added to the pool and associate the logical storage area with a physical area that belongs to the pool when a logical usage amount that indicates the amount of the logical storage area allocated to the virtual volume exceeds a predetermined threshold value.

11. The management server of claim 10, wherein:
the management server is further configured to preferentially determine, when the physical usage amount exceeds a predetermined threshold value, from among the RAID groups having logical devices assigned to the pool, logical devices included in a RAID group whose total of the logical devices already assigned to the pool is less than a real capacity of the RAID group for addition to the pool; and
the real capacity of the RAID group is a total of the physical areas of the storage devices belonging to the RAID group.

12. The management server of claim 10, wherein:
the management server is further configured to preferentially determine, when the logical usage amount exceeds a predetermined threshold, from among the RAID groups having logical devices assigned to the pool, logical devices included in a RAID group whose total of the logical devices already assigned to the pool is greater than or equal to a real capacity of the RAID group for addition to the pool; and
the real capacity of the RAID group is a total of the physical areas of the storage devices belonging to the RAID group.

13. A storage medium for storing a program executed by a computer having a processor and a plurality of storage devices each providing a logical storage area to the processor,
wherein the storage device has a predetermined amount of physical area, and is configured to:
generate, in response to receiving a write request for data from the processor with respect to the logical storage area, compressed data by compressing the data,
store the compressed data in the physical area, and
manage, in association with the logical storage area, the physical area in which the compressed data is stored; and
the program causes the processor to execute a method comprising:
a step of forming a virtual volume,
a step of defining, using logical storage areas provided by the plurality of storage devices, a RAID group having one or more logical devices, a step of managing, by assigning it to a pool, a logical device having a logical storage area allocatable to the virtual volume, a step of allocating an unused logical storage area in the pool to a virtual page that received a data write request in the virtual volume, and performing a data write to the storage device having the allocated logical storage area, a step of increasing, among the physical areas assigned to the pool, the amount of the physical area assigned to the pool when a physical usage amount that indicates the amount of the physical area associated with the logical storage area allocated to the virtual volume exceeds a predetermined threshold value, and a step of increasing, among the logical storage areas assigned to the pool, the amount of the logical storage area assigned to the pool and associating the logical storage area with a physical area that belongs to the pool when a logical usage amount that indicates the amount of the logical storage area allocated to the virtual volume exceeds a predetermined threshold value.

14. The storage medium for storing the program of claim 13, wherein the program causes the processor to determine, in response to either the physical usage amount or the logical usage amount exceeding the predetermined threshold value, logical devices to be added to the pool.

15. The storage medium for storing the program of claim 14, wherein the program causes the processor to add to the pool, when increasing the amount of the physical area, from among the RAID groups having logical devices assigned to the pool, logical devices included in a RAID group whose total of the logical devices already assigned to the pool is less than the sum of the physical areas of the storage devices belonging to the RAID group.

* * * * *